United States Patent
Cobern

(10) Patent No.: US 10,113,363 B2
(45) Date of Patent: Oct. 30, 2018

(54) SYSTEM AND RELATED METHODS FOR CONTROL OF A DIRECTIONAL DRILLING OPERATION

(71) Applicant: APS Technology, Inc., Wallingford, CT (US)

(72) Inventor: Martin E. Cobern, Cheshire, CT (US)

(73) Assignee: APS Technology, Inc., Wallingford, CT (US)

(*) Notice: Subject to any disclaimer, the term of this patent is extended or adjusted under 35 U.S.C. 154(b) by 815 days.

(21) Appl. No.: 14/536,379

(22) Filed: Nov. 7, 2014

(65) Prior Publication Data

US 2016/0130878 A1     May 12, 2016

(51) Int. Cl.
| | | |
|---|---|---|
| *E21B 7/04* | (2006.01) | |
| *E21B 47/024* | (2006.01) | |
| *E21B 44/00* | (2006.01) | |
| *G05B 19/402* | (2006.01) | |

(52) U.S. Cl.
CPC .............. *E21B 7/04* (2013.01); *E21B 44/005* (2013.01); *E21B 47/024* (2013.01); *G05B 19/402* (2013.01); *G05B 2219/45129* (2013.01); *G05B 2219/45208* (2013.01); *G05B 2219/49113* (2013.01)

(58) Field of Classification Search
CPC ..... E21B 7/06; E21B 7/04; E21B 7/10; E21B 44/00; E21B 44/005
See application file for complete search history.

(56) References Cited

U.S. PATENT DOCUMENTS

| | | |
|---|---|---|
| 2,345,766 A | 4/1944 | Miller |
| 2,906,143 A | 9/1959 | Muser |
| 3,062,303 A | 11/1962 | Schultz |
| 3,092,188 A | 6/1963 | Farris |

(Continued)

FOREIGN PATENT DOCUMENTS

| | | |
|---|---|---|
| EP | 0530045 | 3/1993 |
| EP | 0540045 | 5/1993 |

(Continued)

OTHER PUBLICATIONS

U.S. Appl. No. 60/676,072, filed Apr. 29, 2005, Martin E. Cobern.

(Continued)

*Primary Examiner* — Robert E Fuller
(74) *Attorney, Agent, or Firm* — Offit Kurman, P.A.; Gregory A. Grissett

(57) ABSTRACT

A system and method can include a module including at least one actuation assembly configured to transition between an inactive configuration and an active configuration. The system include at least one sensor configured to obtain data that is indicative of an operating parameter, and at least one processor configured to be electronically coupled to the guidance module and the at least one sensor. The at least one processor is configured to, in response to 1) input received from the at least one sensor that is indicative of the measured operating parameter, and 2) received input that is indicative of an actual drilling direction that is deviated from the predetermined drilling direction, adjust an extent that the actuation assembly is in the active configuration.

23 Claims, 19 Drawing Sheets

(56) References Cited

U.S. PATENT DOCUMENTS

| | | |
|---|---|---|
| 3,650,338 A | 3/1972 | McNeely |
| 3,825,081 A | 7/1974 | McMahon |
| 3,903,974 A | 9/1975 | Cullen |
| 3,968,473 A | 7/1976 | Patton et al. |
| 4,220,213 A | 9/1980 | Hamilton |
| 4,303,994 A | 12/1981 | Tanguy |
| 4,305,474 A | 12/1981 | Farris |
| 4,319,649 A | 3/1982 | Jeter |
| 4,324,297 A | 4/1982 | Denison |
| 4,343,369 A | 8/1982 | Lyons et al. |
| 4,359,898 A | 11/1982 | Tanguy et al. |
| 4,445,578 A | 5/1984 | Millheim |
| 4,479,564 A | 10/1984 | Tanguy |
| 4,507,735 A | 3/1985 | Moorehead et al. |
| 4,608,861 A | 9/1986 | Wachtler et al. |
| 4,638,873 A | 1/1987 | Wellborn |
| 4,709,726 A | 1/1987 | Fitzgibbons et al. |
| 4,662,458 A | 5/1987 | Ho |
| 4,715,451 A | 12/1987 | Bseisu et al. |
| 4,732,223 A | 3/1988 | Schoeffler et al. |
| 4,739,843 A | 4/1988 | Burton |
| 4,760,735 A | 8/1988 | Sheppard et al. |
| 4,802,143 A | 1/1989 | Smith |
| 4,821,563 A | 4/1989 | Maron |
| 4,884,643 A | 12/1989 | Wawrzynowski |
| 4,958,125 A | 9/1990 | Jardine et al. |
| 4,958,517 A | 9/1990 | Maron |
| 5,048,621 A | 9/1991 | Bailey |
| 5,052,501 A | 10/1991 | Wenzel et al. |
| 5,117,927 A | 6/1992 | Askew |
| 5,125,463 A | 6/1992 | Livingstone |
| 5,131,479 A | 7/1992 | Boulet |
| 5,168,943 A | 12/1992 | Falgout, Sr. |
| 5,193,628 A | 3/1993 | Hill et al. |
| 5,251,708 A | 10/1993 | Perry et al. |
| 5,311,953 A | 5/1994 | Walker |
| 5,363,095 A | 11/1994 | Normann et al. |
| 5,386,724 A | 2/1995 | Das et al. |
| 5,419,405 A | 5/1995 | Patton |
| 5,813,480 A | 9/1998 | Zaleski et al. |
| 5,857,531 A | 1/1999 | Estep et al. |
| 6,050,346 A | 4/2000 | Hipp |
| 6,057,784 A | 5/2000 | Schaaf et al. |
| 6,068,394 A | 5/2000 | Dublin |
| 6,089,332 A | 7/2000 | Barr |
| 6,102,681 A | 8/2000 | Turner |
| 6,105,690 A | 8/2000 | Biglin |
| 6,213,205 B1 | 4/2001 | Surjaatmadja |
| 6,216,802 B1 | 4/2001 | Sawyer |
| 6,230,823 B1 | 5/2001 | Sieniawski |
| 6,244,361 B1 | 6/2001 | Comeau et al. |
| 6,257,356 B1 | 7/2001 | Wassell |
| 6,321,857 B1 | 11/2001 | Eddison |
| 6,328,119 B1 | 12/2001 | Gillis |
| 6,392,561 B1 | 5/2002 | Davies |
| 6,427,783 B2 | 8/2002 | Krueger et al. |
| 6,554,083 B1 | 4/2003 | Kerstetter |
| 6,595,303 B2 | 7/2003 | Noe |
| 6,626,254 B1 | 9/2003 | Krueger |
| 6,659,200 B1 | 12/2003 | Eppink |
| 6,714,138 B1 | 3/2004 | Turner |
| 6,799,646 B1 | 10/2004 | Daigle et al. |
| 6,802,215 B1 | 10/2004 | Boucher et al. |
| 6,808,027 B2 | 10/2004 | McLoughlin et al. |
| 6,913,095 B2 | 7/2005 | Kruger |
| 7,013,994 B2 | 3/2006 | Eddison |
| 7,327,634 B2 | 2/2008 | Perry |
| 7,389,830 B2 | 6/2008 | Turner et al. |
| 7,503,408 B2 | 3/2009 | Walker et al. |
| 7,556,105 B2 | 7/2009 | Krueger |
| 7,661,488 B2 | 2/2010 | Andoskin et al. |
| 7,681,663 B2 | 3/2010 | Cobern |
| 7,762,356 B2 | 7/2010 | Turner |
| 7,942,214 B2 | 5/2011 | Johnson et al. |
| 7,999,695 B2 | 8/2011 | Rodney et al. |
| 8,011,452 B2 | 9/2011 | Downton |
| 8,087,477 B2 | 1/2012 | Sullivan et al. |
| 8,087,479 B2 | 1/2012 | Kulkarni et al. |
| 8,157,025 B2 | 4/2012 | Johnson |
| 8,205,686 B2 | 6/2012 | Beuershausen |
| 8,397,562 B2 | 3/2013 | Wassell et al. |
| 8,534,385 B2 | 9/2013 | Malcolm |
| 8,590,636 B2 | 11/2013 | Menger |
| 2001/0052428 A1 | 12/2001 | Larronde et al. |
| 2002/0070050 A1 | 6/2002 | Wassell |
| 2004/0016571 A1 | 1/2004 | Krueger |
| 2004/0216921 A1* | 11/2004 | Krueger .................. E21B 7/068 175/24 |
| 2004/0262043 A1 | 12/2004 | Schuaf |
| 2005/0109097 A1 | 5/2005 | Bogath et al. |
| 2005/0150689 A1 | 7/2005 | Jogi et al. |
| 2006/0215491 A1 | 9/2006 | Hall |
| 2006/0260843 A1 | 11/2006 | Cobern |
| 2007/0095575 A1 | 5/2007 | Johnson et al. |
| 2008/0197732 A1 | 8/2008 | Cioceanu |
| 2009/0044980 A1* | 2/2009 | Sheppard .................. E21B 7/06 175/24 |
| 2009/0050370 A1* | 2/2009 | Peters ...................... E21B 7/06 175/45 |
| 2010/0006341 A1 | 1/2010 | Downton |
| 2010/0032212 A1 | 2/2010 | Van Steenwyk et al. |
| 2014/0131106 A1 | 5/2014 | Coull |

FOREIGN PATENT DOCUMENTS

| | | |
|---|---|---|
| EP | 0770760 | 5/1997 |
| EP | 0874128 | 10/1998 |
| EP | 0904478 | 8/2000 |
| GB | 2 259 316 | 3/1998 |
| GB | 2 343 470 | 5/2000 |
| GB | 2 408 526 | 6/2005 |
| GB | 2 410 042 | 7/2005 |
| GB | 2 427 222 | 12/2006 |
| WO | WO 1997-047848 | 12/1997 |
| WO | WO 02-059447 | 8/2000 |
| WO | WO 2001-025586 | 4/2001 |
| WO | WO 2001-46549 | 6/2001 |
| WO | WO 2002-059447 | 8/2002 |
| WO | WO 2003-076760 | 9/2003 |
| WO | WO 2005-028805 | 3/2005 |
| WO | WO 2009-129386 | 10/2009 |

OTHER PUBLICATIONS

U.S. Appl. No. 14/675,378, filed Mar. 31, 2015, Murray et al.
Catalog. Schlumberger, Power Drive Vortex, Rotary Steerable System for Supercharged Drilling, Mar. 2005, 5 pgs.
Catalog. Schlumberger, Power Drive Xtra Series, Complete Series of Rotary Steerable Systems for Reduced Well Construction Cost, Oct. 2002, 7 pages.
Durant, Slimhole Rotary Steerable System Now a Reality, Drilling Contractor, Jul. Aug. 2002_ pp. 24-25.
In the United States Patent and Trademark Office, In Re: U.S. Appl. No. 11/117,802 Non-Final Office Action dated May 15, 2007.
International Application No. PCT/US2013/069054; International Search Report dated Apr. 23, 2014, 15 pages.
International Application No. PCT/US2015/014312: International Search Report and Written Opinion dated Sep. 17, 2015, 18 pages.
In the United States Patent and Trademark Office, In Re: U.S. Appl. No. 09/734,983, Non-final Office Action dated Apr. 9, 2002.
Response to Written Opinion under Article 34 submitted May 27, 2011 in PCT/US2010/043985.
International Application No. PCT/US2010/043985: International Search Report and Written Opinion dated Sep. 22, 2010.
Schlumberger, PowerDrive Xtra 475 Rotary Steerable System, SMP.5897.1_connect.slb.com, Dec. 2002, 2 pages.
Schlumberger, Statoil Saves Big with New Rotary Steerable System, Drilling Contractor, Mar. Apr. 2004, p. 44.

\* cited by examiner

SYSTEM AND RELATED METHODS FOR CONTROL OF A DIRECTIONAL DRILLING OPERATION

FIELD OF THE INVENTION

The present disclosure relates to a system for guiding the direction of a drill bit, and in particular to a system and related methods for guiding the drill bit as it forms a borehole during a drilling operation.

BACKGROUND OF THE INVENTION

Underground drilling, such as gas, oil, or geothermal drilling, generally involves drilling a bore through a formation deep in the earth. Such bores are formed by connecting a drill bit to long sections of pipe, referred to as a "drill pipe," to form an assembly commonly referred to as a "drill string." Rotation of the drill bit advance the drill bit advances into the earth, thereby forming the bore. Directional drilling refers to drilling systems configured to allow the drilling operator to direct the drill bit in a particular direction to reach a desired target hydrocarbon that is located some distance vertically below the surface location of the drill rig and is also offset some distance horizontally from the surface location of the drill rig. Steerable systems use bent tools located downhole for directional drilling and are designed direct the drill bit in the direction of the bend. Rotary steerable systems use moveable arms that can be directed against the borehole wall as the drill string rotates to cause directional change of the drill bit. Finally, rotatory steerable motor systems also use moveable arms that can be directed against the borehole wall to guide the drill bit. The more recently developed rotary steerable motor systems, unlike rotary steerable systems, use a downhole motor to operate the moveable arms and rotate the drill bit, in addition to or in lieu of, rotation of the drill string. Directional drilling systems have been used to allow drilling operators to access hydrocarbons that were previously un-accessible using conventional drilling techniques. Moreover, rotary steerable motor systems, in particular, can result in a borehole that is consistent with the well plan. However, the downhole drilling environment can degrade operational efficiency and service life the even the most robust downhole tools and rotatory steerable motors are no exception here.

SUMMARY OF THE INVENTION

An embodiment of the present disclosure is a system configured to guide a drill bit attached to a downhole end of a drill string, the drill bit configured drill a borehole into an earthen formation. The system includes a module having at least one actuation assembly that is configured to apply a force against a wall of the borehole so as to adjust the direction of the drill bit when the module is disposed in the borehole. The actuation assembly is configured to transition between an active configuration and an inactive configuration so as to adjust a magnitude of the force applied by the at least one actuation assembly against the wall of the borehole. The system includes at least one sensor configured to obtain data that is indicative of an operating parameter of the module. The system includes at least one processor electronically coupled to the at least one sensor, wherein the at least one processor is configured to, in response to input received from the at least one sensor that is indicative of the obtained operating parameter, adjust one or more operations of the module, the one or more operations including at least the transition of the at least one actuation assembly between the active and inactive configurations so as to adjust the magnitude of the force applied by the at least one actuation assembly to the wall of the borehole.

Another embodiment of the present disclosure includes a method for guiding a direction of a drill bit coupled to a drill string. The method includes rotating the drill bit to drill a borehole in an earthen formation according to a predetermined drilling direction, and determining if an actual drilling direction that the drill bit is drilling the borehole is within a predetermined threshold of the predetermined drilling direction. If the actual drilling direction is not within the predetermined threshold of the predetermined drilling direction, actuating at least one actuation assembly from an inactive configuration into an active configuration to increase a force applied to the wall of the borehole by the at least one actuation assembly so as to redirect the drill bit toward the predetermined drilling direction. The method includes measuring an operating parameter associated with the at least one actuation assembly when the actuation assembly is in the active configuration. Based on the measured operating parameter, adjusting an extent that the at least one actuation assembly is in the active configuration so as control redirection of the drill bit toward the predetermined drilling direction.

Another embodiment of the present disclosure includes a method for controlling a direction of a drill bit coupled to a drill string. The method includes causing the drill bit to drill a borehole into the earthen formation along a predetermined drilling direction. The method includes guiding the drill bit according to one or more steering parameters toward predetermined drilling direction during formation of the borehole in response to any determined deviations between an actual drilling direction and the predetermined drilling direction. The method includes correcting the steering parameters based on one more operational parameters of the rotary steerable system.

BRIEF DESCRIPTION OF THE DRAWINGS

The foregoing summary, as well as the following detailed description of a preferred embodiment, are better understood when read in conjunction with the appended drawings. In the drawings.

DETAILED DESCRIPTION OF ILLUSTRATIVE EMBODIMENTS

Figure 1:
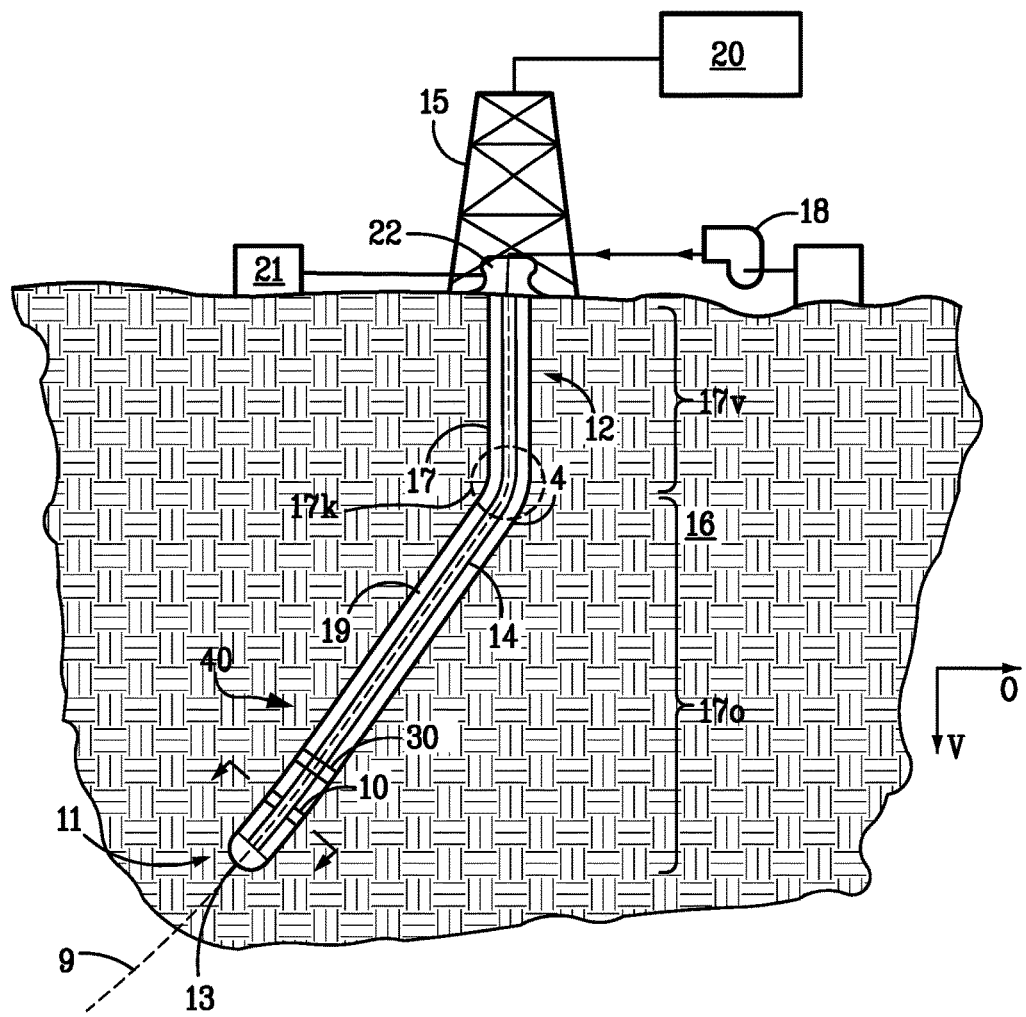
FIG. 1 is side view of drilling system according to an embodiment of present disclosure, depicting the drill string forming a borehole into the earthen formation.

FIG. 1 depicts a drilling system 1 that includes an embodiment of a rotary steerable motor (RSM) system 10 configured to guide the direction of the drill bit 13 through an earthen formation 16 during a drilling operation so as to define the borehole 17. The RSM system 10 of the present disclosure is configured to adjust or correct the steering parameters thereof based upon a value or measure of one or more operational parameters for the RSM system 10. The rotary steerable motor system 10 can be configured to guide the drill bit along a predetermined drilling direction depending on the well plan. The RSM system 10 can also correct the steering parameters as needed to maintain the drill bit 13 drilling along the predetermined drilling direction based on operational parameters of the RSM system 10. For instance, if the drill bit 13 has deviated outside of the path defined in the well plan, the RSM system 10 can guide drill bit 13 back toward the predetermined or desired drilling direction during vertical, steering and tangent angle hold drilling modes used to define a vertical section 17v and offset section 17o the borehole 17. It has been found that as the RSM system 10 is operated over the course of a drilling operation (or several as the case may be), the efficiency of the RSM system 10 degrades thereby degrading directional control of the drill bit 13. The result can be less than ideal directional control while drilling the vertical section 17v and offset section 17o, and less than the planned build-up rate (degrees per 100 feet) during the directional change portions of the well plan. Accordingly, an aspect of the present disclosure in an improved RSM system 10, control system, and method for guiding a drill bit 13 during the drilling operation. The improvements provide a more reliable mechanism to correct deviations of the drill bit 13 off the predetermined drilling direction while drilling the straight vertical section 17v or a combination of the vertical and offset sections 17v and 17o.

Continuing with FIG. 1, the well plan may call for a borehole 17 with a vertical section 17v and an offset section 17o that extends along the borehole axis 9. The RSM system 10 can be operated in vertical, steering, and tangent angle hold modes to define vertical and offset sections 17v and 17o of the borehole 17. For instance, the RSM system 10 can guide the drill bit 13 along the vertical direction V to maintain relatively straight drilling during the vertical section 17v of the borehole 17 when operating in a vertical drilling mode. The RSM system 10 is configured to redirect the drill bit 13 toward the vertical direction V when the drill bit 13 has deviated away from the predetermined drilling direction when drilling the vertical section 17v. Further, the RSM system 10 is configured to operate in a steering mode to turn the drill bit 13 from the vertical direction V at a kickoff point 17k toward an offset direction O. The offset direction O is angularly offset from the vertical direction V and may include a horizontal direction (not shown) that is mostly perpendicular to the vertical direction V to be aligned with or parallel to the surface 4. The RSM system 10 is also configured to maintain the desired level of steering when in the steering mode to guide the drill bit 13 toward and into the offset direction O thereby drilling the offset section 17o of the borehole 17. When the drill bit 13 has achieved its desired orientation off of the kickoff point 17k, the RSM system 10 con operate in the so-called tangent angle hold mode to guide drill bit 13 along the offset direction O in order to drill the offset section 17o in accordance with the well plan. As used herein, the predetermined drilling direction is the can refer to the desired or planned drilling direction when drilling 1) the vertical section 17v of borehole 17, 2) the section of the borehole between the kick-off 17k point and when the desired offset direction O is attained, and 3) when drilling the offset section 17o of the borehole 17.

It should be appreciated that all or a portion of the borehole 17 can be angularly offset with respect to the vertical direction V along the offset direction O. The terms "vertical" and "offset" as used herein are as understood in the drilling field, and are thus approximations. Further, the offset direction can extend along any direction that is perpendicular to the vertical direction V, for instance north, east, south, and west, as well as any incremental direction between north, east, south, and west. The drilling direction or well path extends partially along the vertical direction V and the offset direction O in any particular geographic direction as noted above.

Continuing with FIG. 1, the drilling system 1 can include a drilling rig 15 that supports a drill string 12 with a drill bit 13 coupled to a downhole end of the drill string 12. A bottom hole assembly 11 typically forms the downhole end of the drill string 12 and can include the RSM system 10, a measurement-while-drilling (MWD) tool 30, a telemetry system 40 in communication with the MWD tool 30, and the drill bit 13. Operation of drilling rig 15 and the drill string 12 can be controlled in response to operator inputs by a surface control system 20. As used herein, downhole or downhole location means a location closer to the bottom end of the drill string 12 than the top end of the drill string 12. Accordingly, a downhole direction D refers to the direction from the surface toward a bottom end (not numbered) of the borehole 17 along a borehole axis 9, while an uphole direction U refers the direction from the bottom end of the borehole 2 toward the surface along the borehole axis 9.

Continuing with FIG. 1, the drill bit 13 is rotated, in part, by the drill string 12 to define the borehole 17 into the earthen formation. The drill string 12 is rotated by a motor 21 of a drilling rig 15 located on the surface. Drilling torque can be transmitted from the motor 21 to the drill bit 13 through a turntable 22, such as a Kelly (not shown), and the drill string 12. Other mechanisms, such as top drive, can be used to impart drilling torque to the drill string 12. Because the drill bit 13 is coupled to the drill string 12, rotating drill string 12 causes the drill bit 13 to rotate. The rotating drill bit 13 advances into the earth formation 16, thereby forming a bore 17. Drilling mud is pumped from the surface by a pump 18 located at the surface, through the drill string 12, and out of the drill bit 13. The drilling mud, upon exiting the drill bit 13, returns to the surface by way of an annular passage 19 formed between the drill string 12 and the surface of the bore 17.

The drill string 12 is formed by connecting relatively long sections of pipe, commonly referred to as "drill pipe," as the drill bit 13 progresses through the earthen formation 16. The length of the drill string 12 is increased as the drill bit 13 progresses deeper into the earth formation 16, by connecting additional sections of drill pipe thereto. Rotation of the drill string 12 is stopped at set intervals so that the additional sections of drill pipe can be added. During such a stoppage, MWD surveys may be conducted to obtain drilling data (e.g. inclination, tool face angle, vibration data, etc.) and formation data. The drilling data and formation data may be used to assist in operation and control of the drilling system 1 as noted above. For instance, the operator may control aspects of the drilling system 1 based on the obtained drilling data and/or formation data. Alternatively, the surface control system 20 can direct adjustments of one or more operational parameters in response to drilling data and/or formation data.

Figure 11:
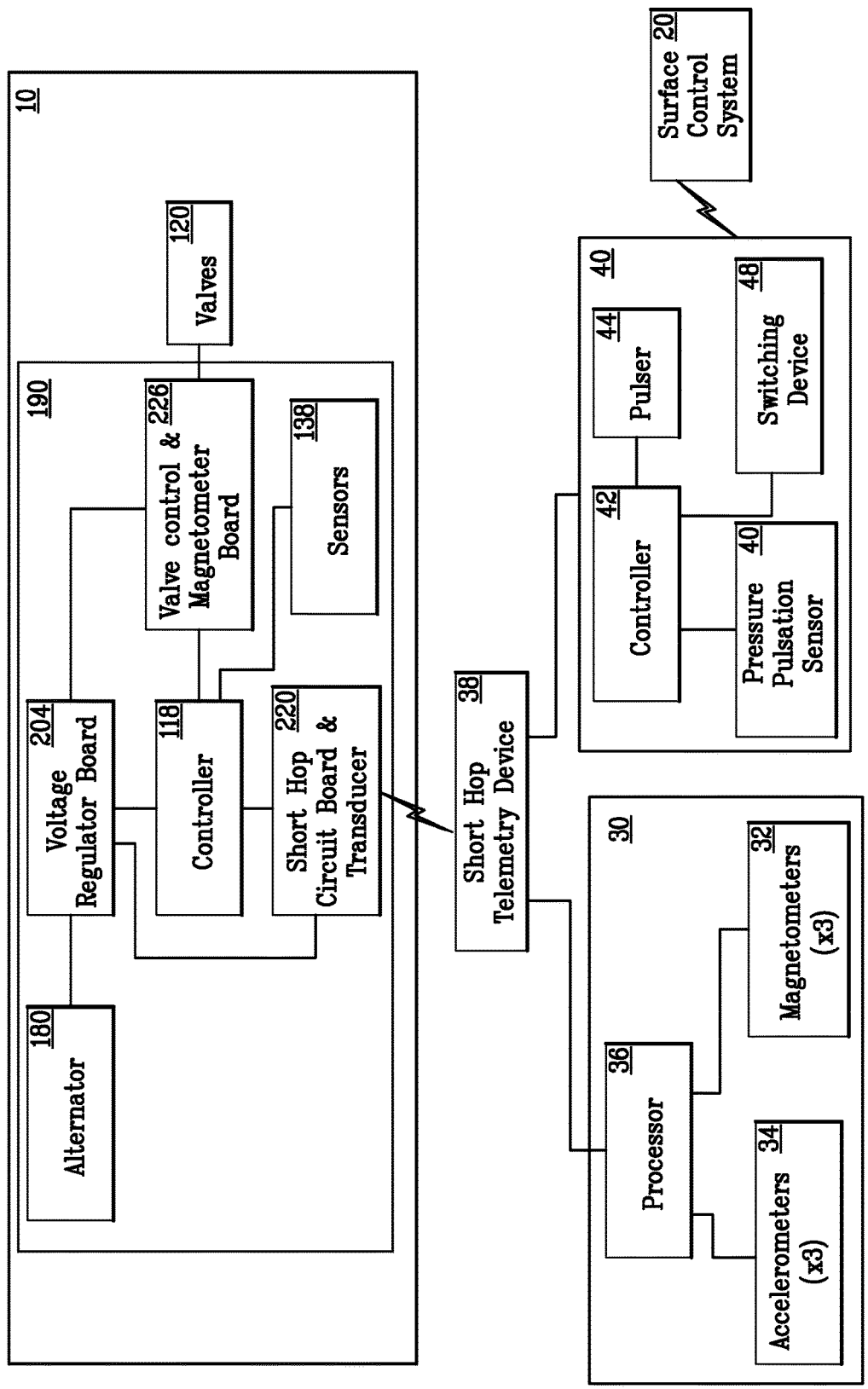
FIG. 11 is a diagram illustrating system components for the drilling system shown in FIG. 1.

The RSM system 10 comprises at least a drilling motor 25 operatively coupled to a module 110, and a control system 190 including at least one controller 118 (FIG. 11). The RSM system control system 190 is configured to operate the module 110 as determined according the well plan, and, as needed, cause the module 110 to direct the drill bit 13 toward a predetermined drilling direction. The RSM system 10 can include a plurality of actuation assemblies 112. The actuation assemblies are configured in one embodiment to be an extended configuration such that actuation assembly is in contact with wall of the borehole during the drilling operation and applies an initial force against the wall. The actuation assemblies can be actuated to between a first or inactive configuration where the actuation assembly 112 is in contact with the borehole wall and applies a minimal for first force to the borehole wall, and an active configuration where the arm applies a second force to the wall that is greater than the first force. Application of the second force to the wall causes a directional change and adjustment in the drill bit. For instance, the RSM system 10 is configured to cause the actuation assembly 112 to transition into the active configuration during a portion of the revolution of the drill string 12. The extent along a revolution that the arm applies the second force to the wall of the borehole, i.e. when actuation assembly 112 is in the active configuration, is referred to as the dwell angle. The RSM system can control the extent of the dwell angle for each actuation assembly 112 so as effect a directional shift of the drill bit 13, as will be further detailed below. In alternative embodiments, however, the actuation assembly is configured to transition between a retracted position, where actuation assembly 112 is disposed toward a central axis 8 of the rotary steerable motor system 10, to an extended position, where the actuation assembly 112 is disposed outwardly from the retracted position away from the central axis. In such alternative embodiments, the retracted position can correspond to the inactive configuration described above and the extended position can correspond to active configuration. Extension of the actuation assembly 112 outwardly to contact the borehole wall can also cause a directional change or adjustment of the drill bit 13.

Figure 2:
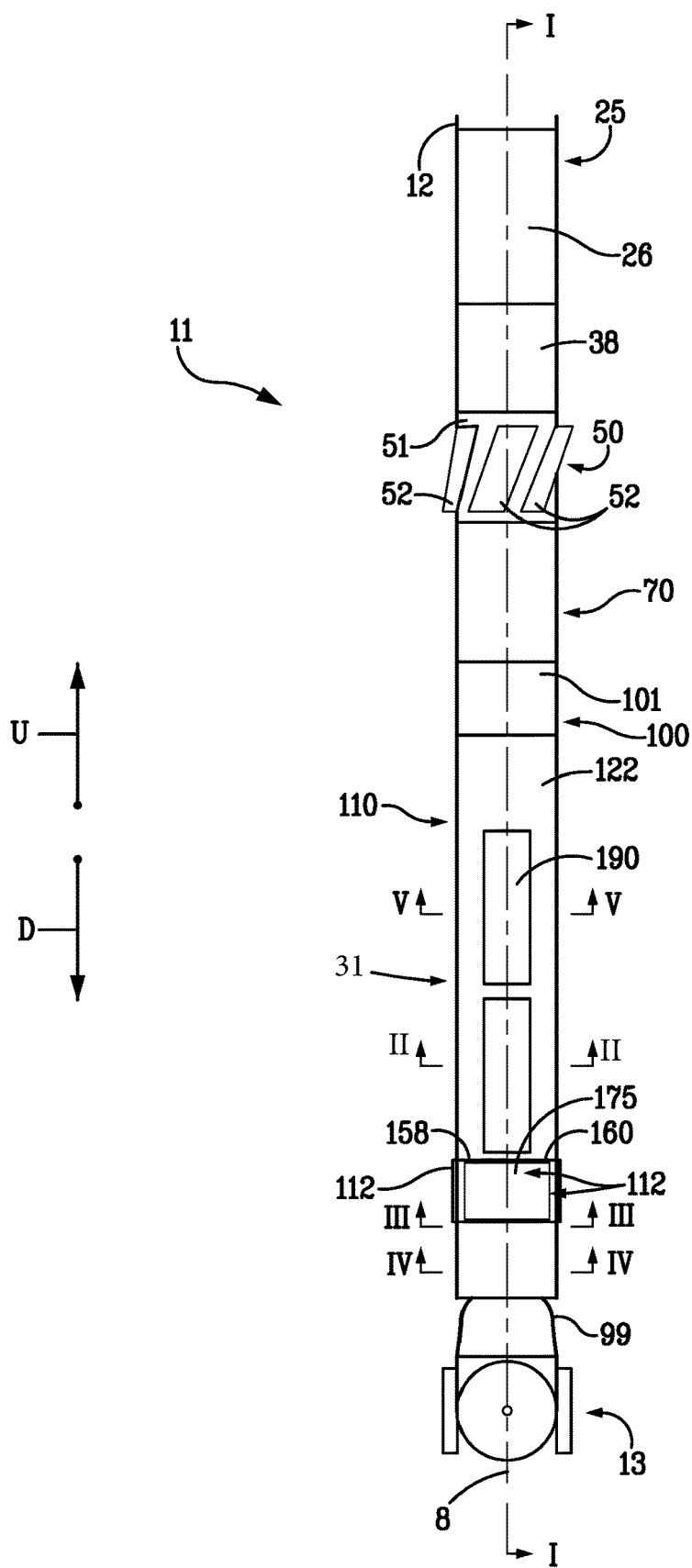
FIG. 2 is a side view of a bottomhole assembly of the drilling system shown in FIG. 1, including a rotary steerable motor system.
Figure 3:
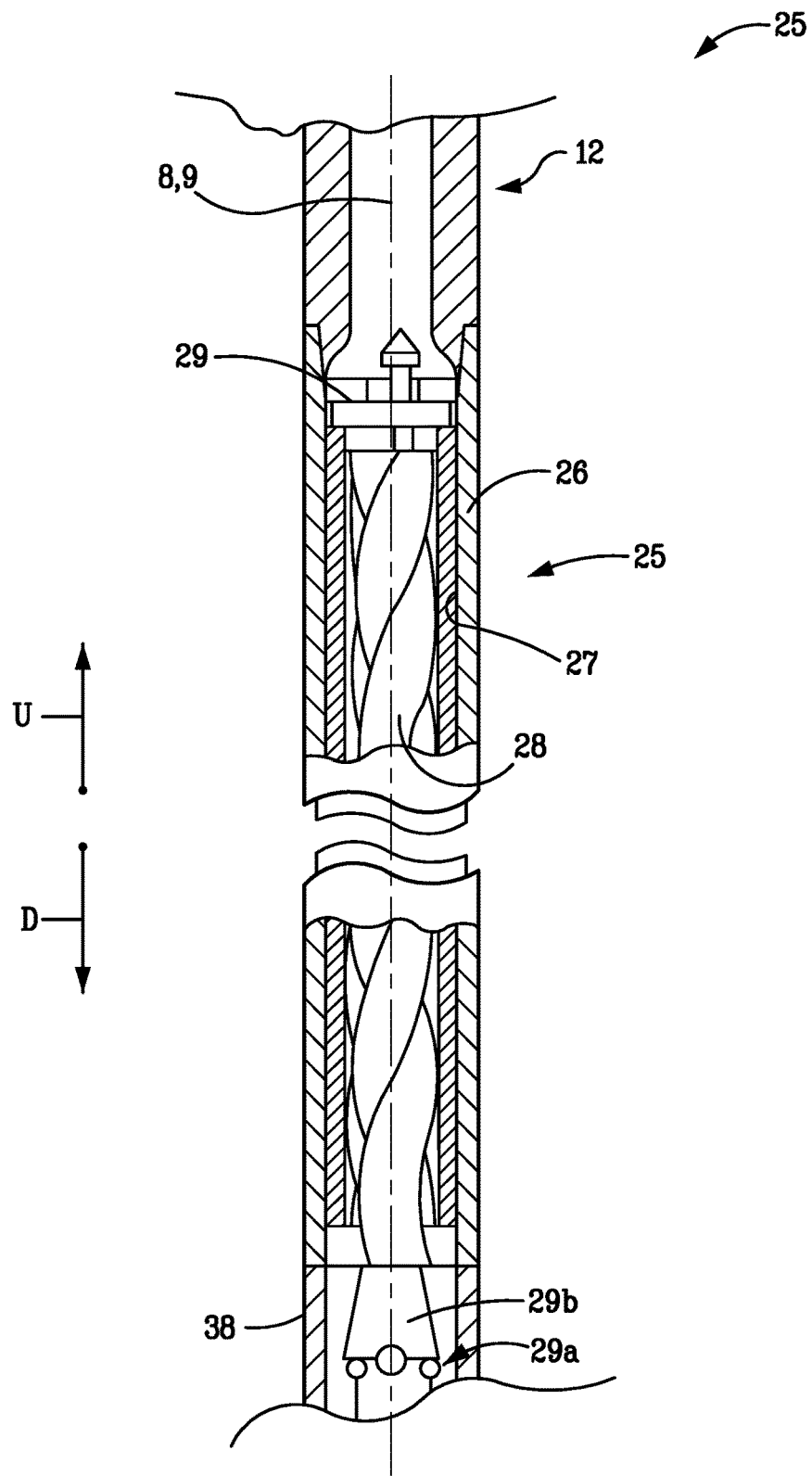
FIG. 3 is a detailed cross-sectional view of a mud motor portion of the rotary steerable motor system shown in FIG. 2, taken through the line "I-I"

Continuing with FIGS. 2 and 3, the drilling motor 25 is coupled to a drive shaft assembly 31 that generally extends along the downhole direction D and is connected to the drill bit 13. The drilling motor 25 can be a helicoidal positive-displacement pump, sometimes referred to as a Moineau-type pump. The drilling motor 25 includes a housing 26, and a stator 27 mounted on an interior surface of the housing 26 (FIG. 3). The drilling motor 25 also includes a rotor 28 supported for rotation within the stator 27. The housing 26 is secured to the section of drill pipe immediately up-hole of the drilling motor 25 by a suitable means such as a threaded connection, so that the housing 26 rotates with the drill pipe. The housing 26 therefore forms part of the drill string 12. Drilling mud at bore pressure is forced between the rotor 28 and the stator 27 in a downhole direction D. The stator 27 and the rotor 28 are shaped so that the movement of the drilling mud therethrough imparts rotation to the rotor 28 in relation to the stator 27. In other words, the rotor 28 extracts hydraulic energy from the flow of drilling mud, and converts the hydraulic energy into mechanical energy. As the housing 26 forms part of the drill string 12, the rotational speed of the drill string 12 is superimposed on the rotational speed of the rotor 28 induced by the flow of drilling mud. The drive shaft assembly 31 and the drill bit 13 are coupled to the rotor 28 so that the rotation of the rotor 28 is imparted to the drive shaft assembly 31 and the drill bit 13. In particular, drive shaft assembly 31 includes an upper drive shaft 53 operably coupled to the drive motor 25 and a lower drive shaft 99 coupled the drill bit 13. Each drive shaft 53 and 99 includes a central passage 106 (FIGS. 3 and 5) through which drilling mud exiting the drilling motor 25 passes through and is directed to the drill bit 13.

The RSM system 10 includes a flexible coupling 29 that couples the drive shaft assembly 31 to the rotor 28. The flexible coupling 29a can include a universal joint 29b that connects the rotor 28 to the drive shaft assembly 31. In certain embodiments, the flexible coupling 29a can be connected to the fluid diverter (not shown), which directs drilling mud toward the drill bit 13. The upper drive shaft 53 is connected to the diverter. Further, the downhole end of the upper drive shaft 53 is threadably coupled to the uphole end of the lower drive shaft 99. The downhole end of the lower drive shaft 99 defines the bit box 105 to which the drill bit 13 is mounted. As such, rotation of the rotor 28 causes the drive shafts 53 to 99 to rotate and thus the drill bit 13.

Figure 5:
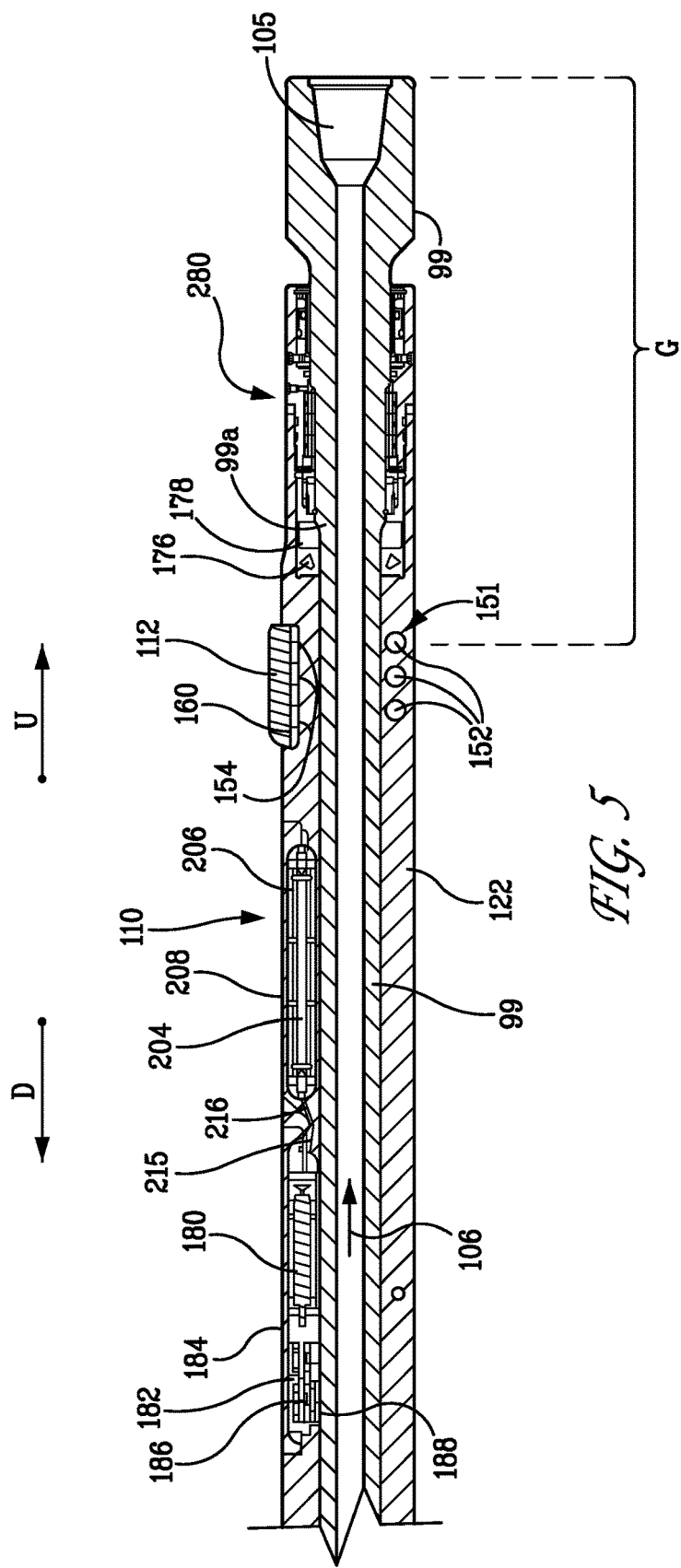
FIG. 5 is a detailed cross-sectional view of the downhole portion of the rotary steerable motor system and bit box shown in FIG. 2, taken through the line "I-I"
Figure 8A:
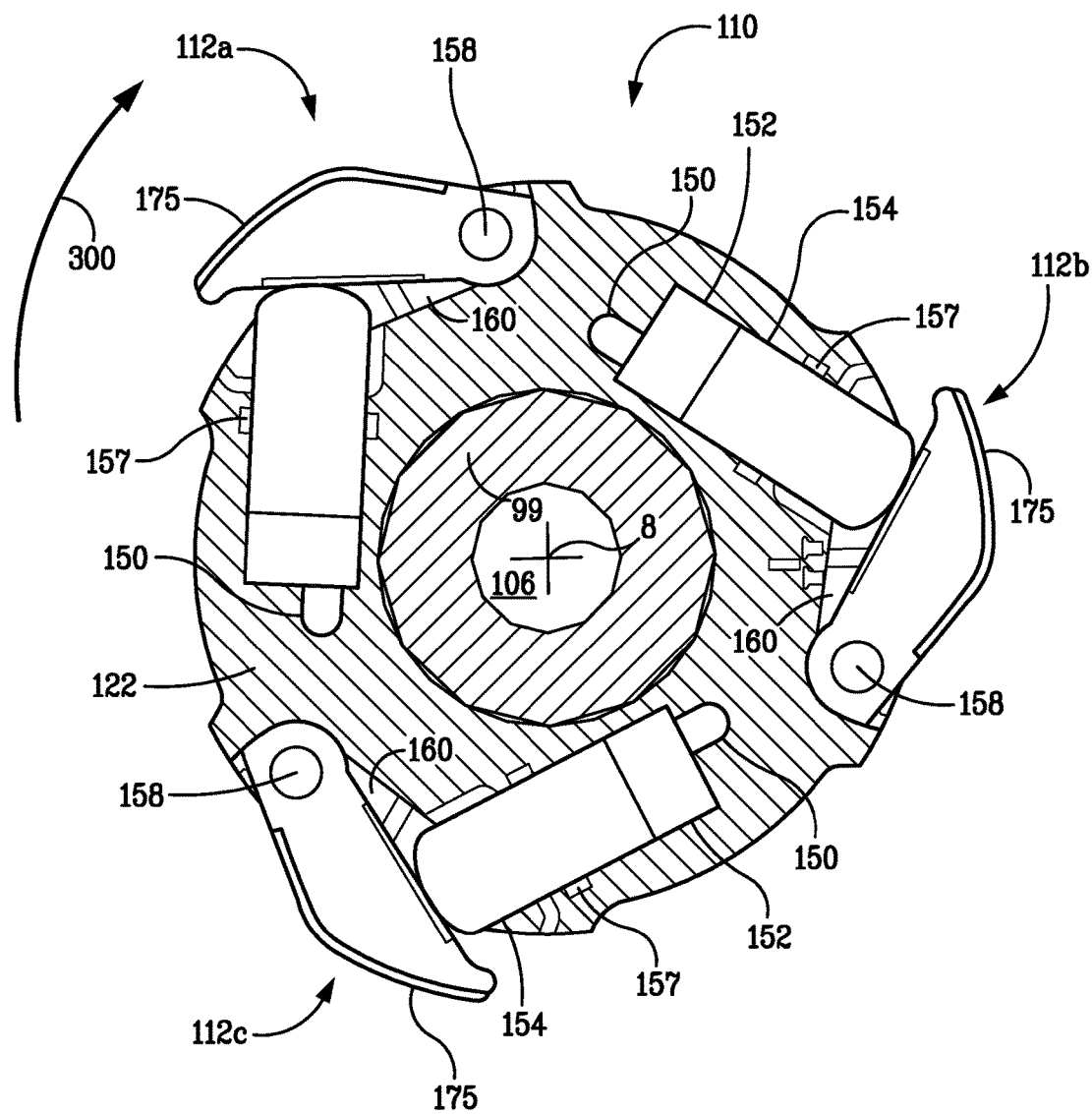
FIG. 8A is a cross sectional view of the rotary steerable motor system shown in FIG. 1, taken through the line "III-III" of FIG. 2.

Turning to FIGS. 2, 5 and 8A, the module 110 is configured to guide the drill bit 13 in a direction coinciding with the predetermined drilling direction of the bore 17. Sometimes the module 110 is referred to as a guidance module. Drill bit guidance is accomplished by causing the actuation assemblies 112 (actuation assemblies 112a, 112b, and 112c are sometimes referred to as actuation assembly 112) to apply varying forces, for instance increasing, the forces applied against the borehole wall on a selective basis to push the drill bit 13 in the desired direction. In accordance with the illustrated embodiment, the actuation assemblies 112 can include arm member and an actuator 154 (FIG. 8A) configured to urge the arm member outwardly in response to input from the module in order to apply a second force against the borehole wall. For instance, the actuation assemblies 112 can be actuated using pressurized fluid disposed in a circuit, such as, for example by oil contained in an hydraulic circuit within the RSM system 10.

Figure 4:
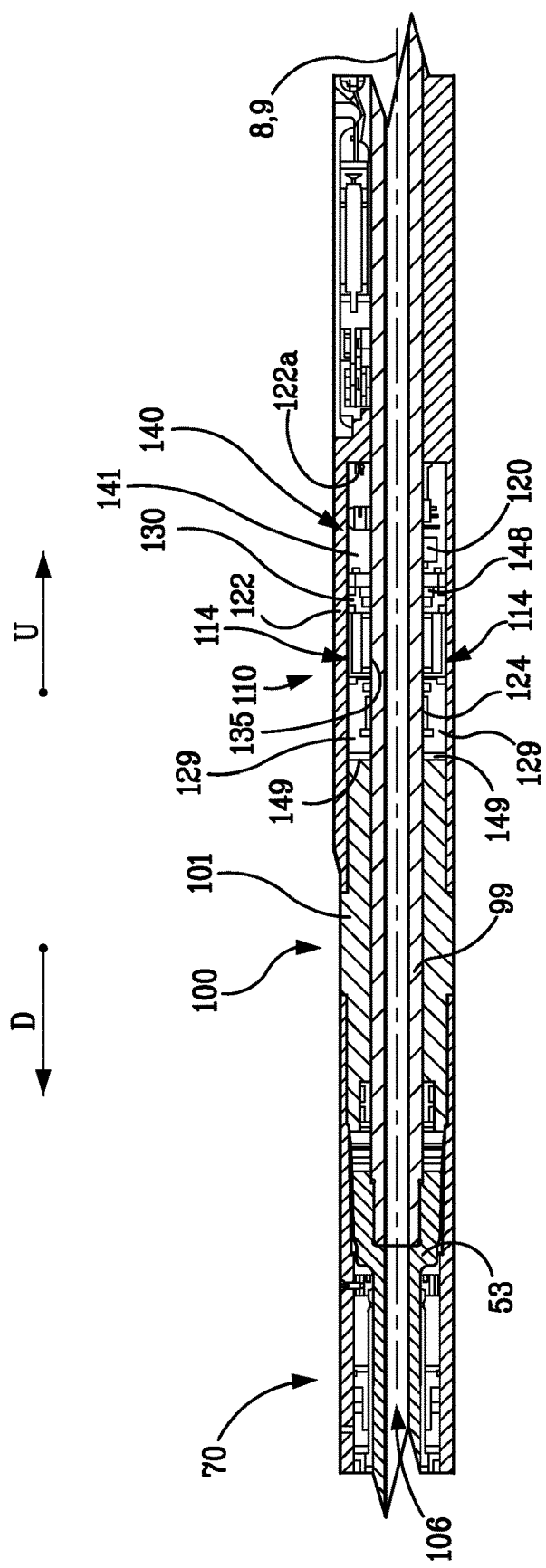
FIG. 4 is a detailed cross-sectional view of an uphole portion of a rotary steerable motor system shown FIG. 2, taken through the line "I-I"

Turning to FIGS. 4 and 5, the guidance module 110 includes a housing 112, a hydraulic pump 114 and a manifold assembly 140. The housing 122 is used to support various components of the RSM system 10 as discussed below. The housing 122 is secured to a housing 101 of a crossover assembly 100 by a suitable means such as a threaded connection, so that the guidance module housing 122 rotates with the housing 101 and the drill string 12. In addition, the guidance module 110 includes two needle roller bearings 124 disposed in the housing 122 and positioned around the lower drive shaft 99. The bearings 124 substantially center the lower drive shaft 99 within the housing 122, while facilitating rotation of the lower drive shaft 99 in relation to the housing 122. The pump 114 is located downhole from the cross-over assembly 101 and the manifold assembly 140 is located downhole from the pump 114.

The pump 114 and hydraulic manifold assembly 140 can be positioned and secured to the housing 122 via an interference fit. For instance, the pump 114 and hydraulic manifold assembly 140 are positioned between the housing 101 of the crossover subassembly 100 and a lip 122a of the housing 122. A crush ring 149 is positioned between the housing 101, and the up-hole end (not shown) of the pump 114. The crush ring 149 is sized so that the stacked length (axial dimension) of the crush ring 149, pump 114, and hydraulic manifold assembly 140 is greater than the distance between the down-hole end of the housing 101, and the lip 122a. The crush ring 149 deforms as the crossover subassembly 100 and the guidance module 110 are mated. The interference generated by the crush ring 149 results in axial and frictional forces between the housing 101, crush ring 149, pump 114, hydraulic manifold assembly 140, and housing 122. These forces help to secure the pump 114 and the hydraulic manifold assembly 140 to the housing 122. The pump 114 and the hydraulic manifold assembly 140 are restrained from rotating in relation to the housing 101 by pins. Thus, the pump 114 and the hydraulic manifold assembly 140 rotate with the drill string 12.

Figure 8B:
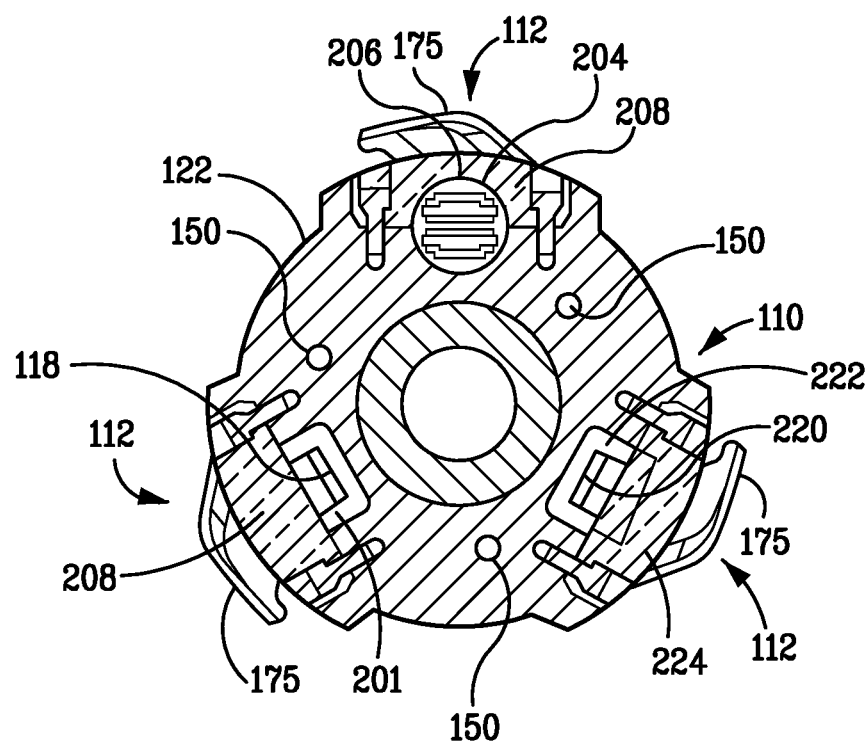
FIG. 8B is a cross sectional view of the rotary steerable motor system shown in FIG. 1, taken through the line "II-II" of FIG. 2.

The guidance module pump 114 and manifold assembly 140 function to control pressure of the fluid in the RSM system to a level suitable for forcing the arm member of the actuation assemblies 112 against the surface of the bore 17 so as the direct the drill bit 13. Each assembly 112 is controlled by the controller 118 (not shown FIGS. 4 and 5) disposed in a cavity 182 of the housing 122. The controller 118 is in electronic communication with three respective electro-hydraulic valves 120 of the manifold assembly 140. The valves 120 are configured to direct the fluid toward a respective one of the actuation assemblies 112 in response to commands from the controller 118 (see FIGS. 8, 9 and 11). The controller 118 can be a microprocessor-based controller. The RSM control system 190, is configured to, in response to inputs from the operator, and/or autonomously in response to inputs received from various downhole sensors, cause the valves 120 to open or close. Opening or closing the valves causes the arm member of the assemblies 112 to apply increased or decreased forces against the borehole wall.

Figure 7A:
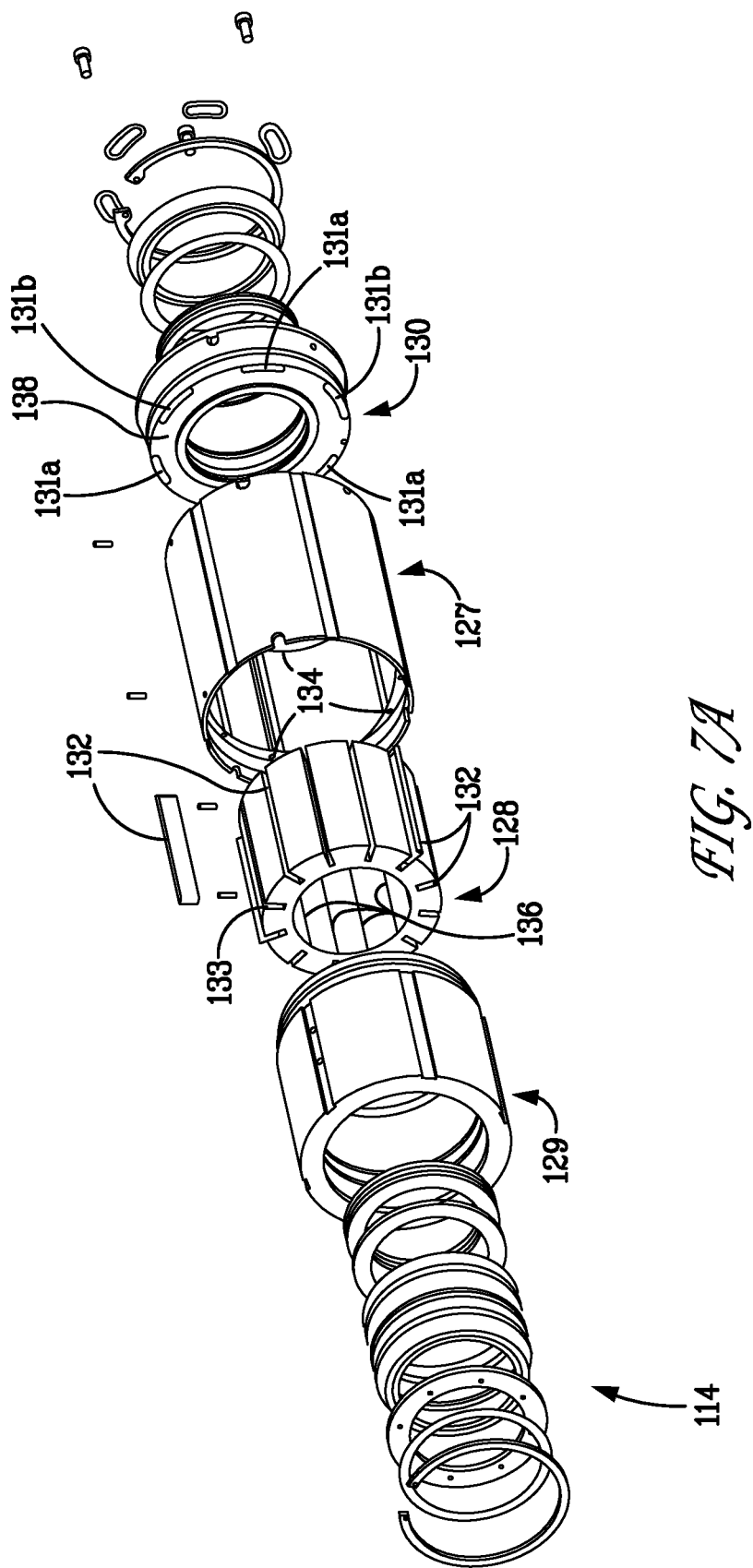
FIG. 7A is an exploded, perspective view of a hydraulic pump of the rotary steerable motor system shown in FIG. 2.
Figure 7B:
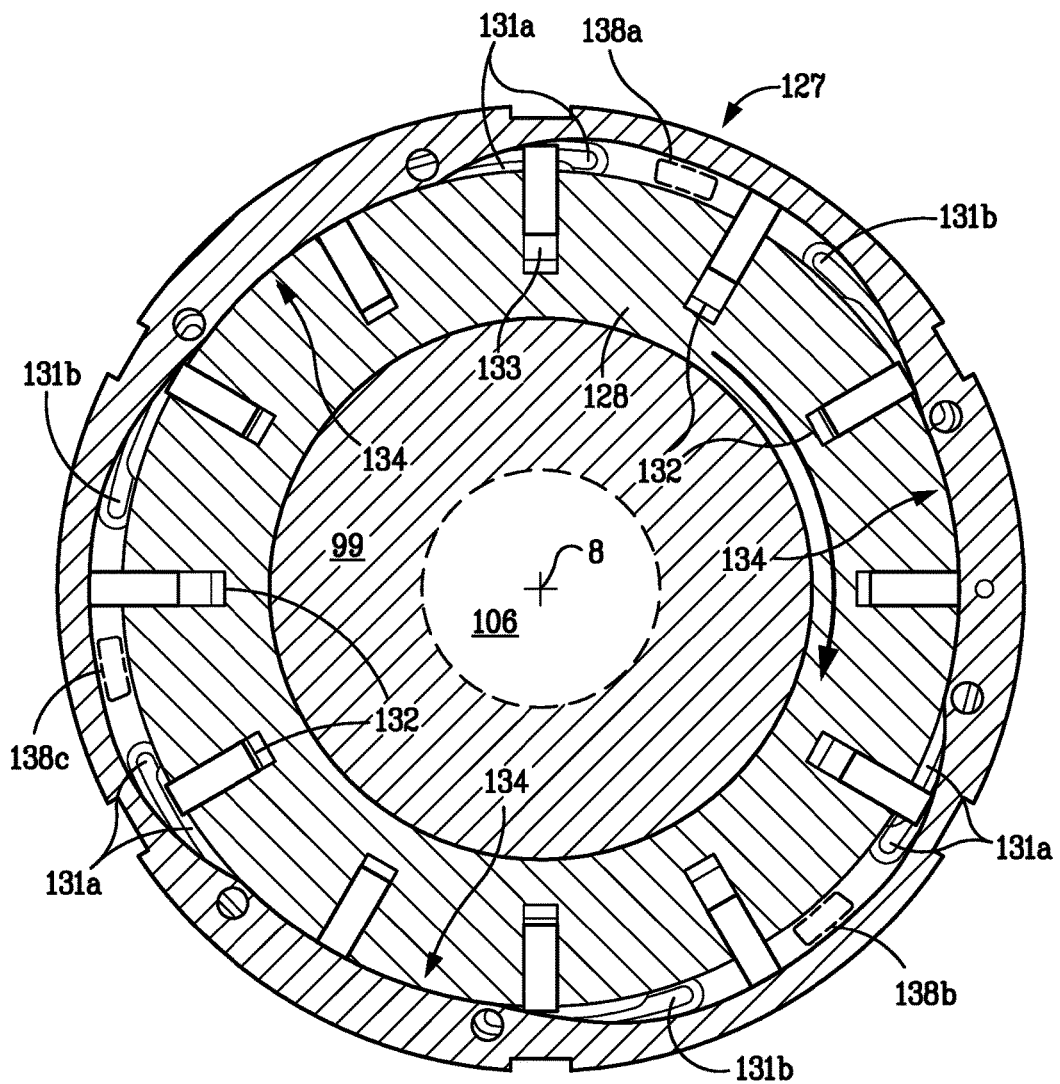
FIG. 7B is a transverse cross-sectional view of the hydraulic pump shown in FIG. 7A.

Turning to FIGS. 7A and 7B, the pump 114 preferably is a hydraulic vane pump. The pump 114 comprises a stator 127, and a rotor 128 disposed concentrically within the stator 127. The pump 114 also comprises a housing 129 secured to a down-hole end of the stator 127, and a manifold 130 secured to an up-hole end of the stator 127. The bearings 124 are disposed concentrically within the bearing seal housing 129. The manifold 130 has three inlet ports 131a, and three outlet ports 131b formed therein. Oil from within the hydraulic circuit enters the hydraulic pump 114 by way of the inlet ports 131a. Oil exits the pump 114 through outlet ports 131b and enters the hydraulic manifold assembly 140 and is directed toward the actuation assemblies 112 for selective force application of the arm member again the borehole wall as further detailed below.

The lower drive shaft 99 extends through the pump 114 so that the housing 122, the pump 114, and the lower drive shaft 99 are substantially concentric. The stator 127, bearing seal housing 129, and manifold 130 of the pump 114 are restrained from rotating in relation to the housing 122, as discussed above.

The rotor 128 is rotatable in relation to the stator 127 by the drive shaft 99, as discussed below. The rotor 128 includes multiple spring-loaded vanes 132 that are disposed in radial grooves 133 formed in the rotor 128. Three cam lobes 134 are positioned around the inner circumference of the stator 127. The cam lobes 134 contact the vanes 132 as the rotor 128 rotates within the stator 127. The shape of the cam lobes 134, in conjunction with the spring force on the vanes 132, causes the vanes 132 to retract and extend into and out of the grooves 133 as the rotor 128 rotates. In particular, each vane 132 moves radially outward as the vane 132 rotates past the inlet ports 131a, due to the shape of the cam lobes 134 and the spring force on the vane 132. This movement generates a suction force that draws oil through the inlet ports 131a, and into an area between the rotor 128 and the stator 127. Further movement of the vane 132 sweeps the oil in the clockwise direction, toward the next cam lobe 134 and outlet port 131b (from the perspective of FIG. 7B). The profile of the cam lobe 134 reduces the area between the rotor 128 and the stator 127 as the oil is swept toward the outlet port 131b, and thereby raises the pressure of the oil. The pressurized oil is forced out of the pump 114 by way of the outlet port 131b.

In accordance with the illustrated embodiment, the pump 114 includes one or more pressure sensor assemblies 138 disposed between one or more of the inlet and outlet portions 131a and 131b. The pressure sensor assembly 138 is configured to measure a pressure differential between the inlet and outlet ports 131a and 131b during operation of the actuation assemblies 112. Further, the pressure sensor assembly 138 is in electronic communication with the controller 118. The controller 118, as noted above, in response to inputs from the sensor assembly 138, can adjust the dwell angle of the actuation assemblies 112 during activation thereof if the pressure in the pump 114 drops below a threshold amount. Details concerning control of the actuation assembly 112 based on pressure differential will be detailed below. However, it should be appreciated that pressure differential data can be used adjust operational parameters for any component of the RSM system operated by the pump 114.

The pump 114 can be operated by the drilling motor 25. As noted above, the drilling motor 25 causes rotation of the drive assembly 31 and the lower drive shaft 99. Because a portion of lower drive shaft 99 is operably connected to the pump 114, the drilling motor 25 can operate pump 114. The portion of the lower drive shaft 99 located within the rotor 128 preferably has splines 135 formed around an outer circumference thereof. The spines 135 extend substantially in the axial direction. The splines 135 engage complementary splines 136 (FIG. 7A) formed on the rotor 128, so that rotation of the lower drive shaft 99 in relation to the housing 122 imparts a corresponding rotation to the rotor 128 (see FIGS. 5 and 7A). The use of the axially-oriented spines 135, 136 facilitates a limited degree of relative movement between lower drive shaft 99 and the rotor 128 in the axial direction. This movement can result from factors such as differential thermal deflection, mechanical loads, etc. Permitting the rotor 128 to move in relation to the lower drive shaft 99 can reduce the potential for the pump 114 to be subject to excessive stresses resulting from its interaction with the lower drive shaft 99. The manifold 130 includes a ball bearing 148 is disposed concentrically within the manifold 130 and helps to center the lower drive shaft 99 within the pump 114. This can reduce the potential for the pump 114 to be damaged by excessive radial loads imposed thereon by the lower drive shaft 99. The bearing 148 can be lubricated by the oil in a hydraulic circuit.

The use of a hydraulic vane pump such as the pump 114 is described for exemplary purposes only. Other types of hydraulic pumps that can operate at the temperatures, pressures, and vibrations typically encountered in a down-hole drilling environment can be used in the alternative. For example, the pump 114 can be an axial piston pump in alternative embodiments.

Turning to FIGS. 4, 6A-6C, the hydraulic manifold assembly 140 located down hole of the pump 114. The hydraulic manifold assembly 140 comprises the valves 120, a body 141, a casing 162 positioned around a portion of the body 141, and a bypass valve 144. The valves 120 and the bypass valve 144 are mounted on the body 141.

Figure 6A:
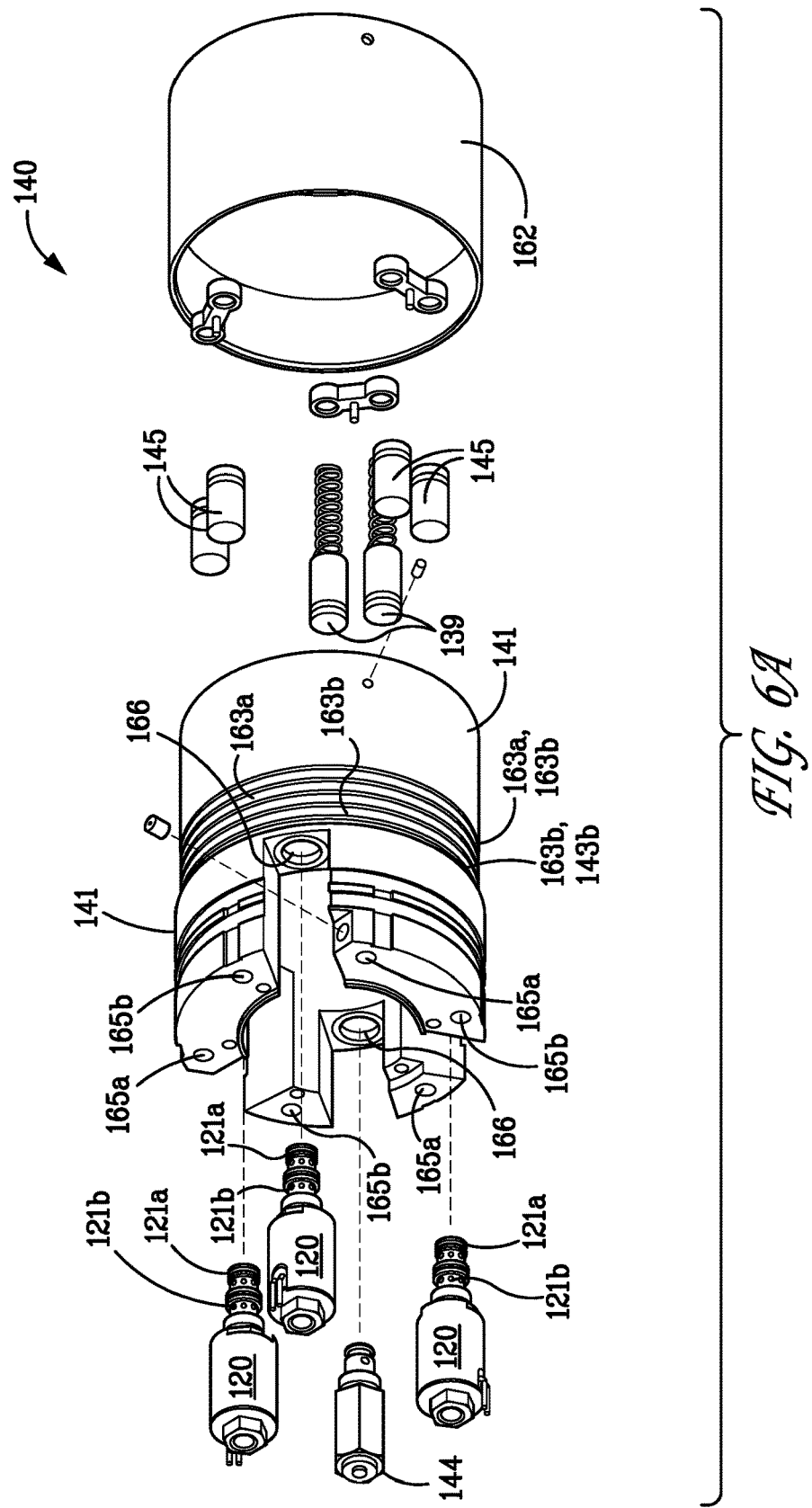
FIG. 6A is an exploded perspective view of a hydraulic manifold assembly of the rotary steerable motor system shown in FIGS. 1-5.
Figure 6B:
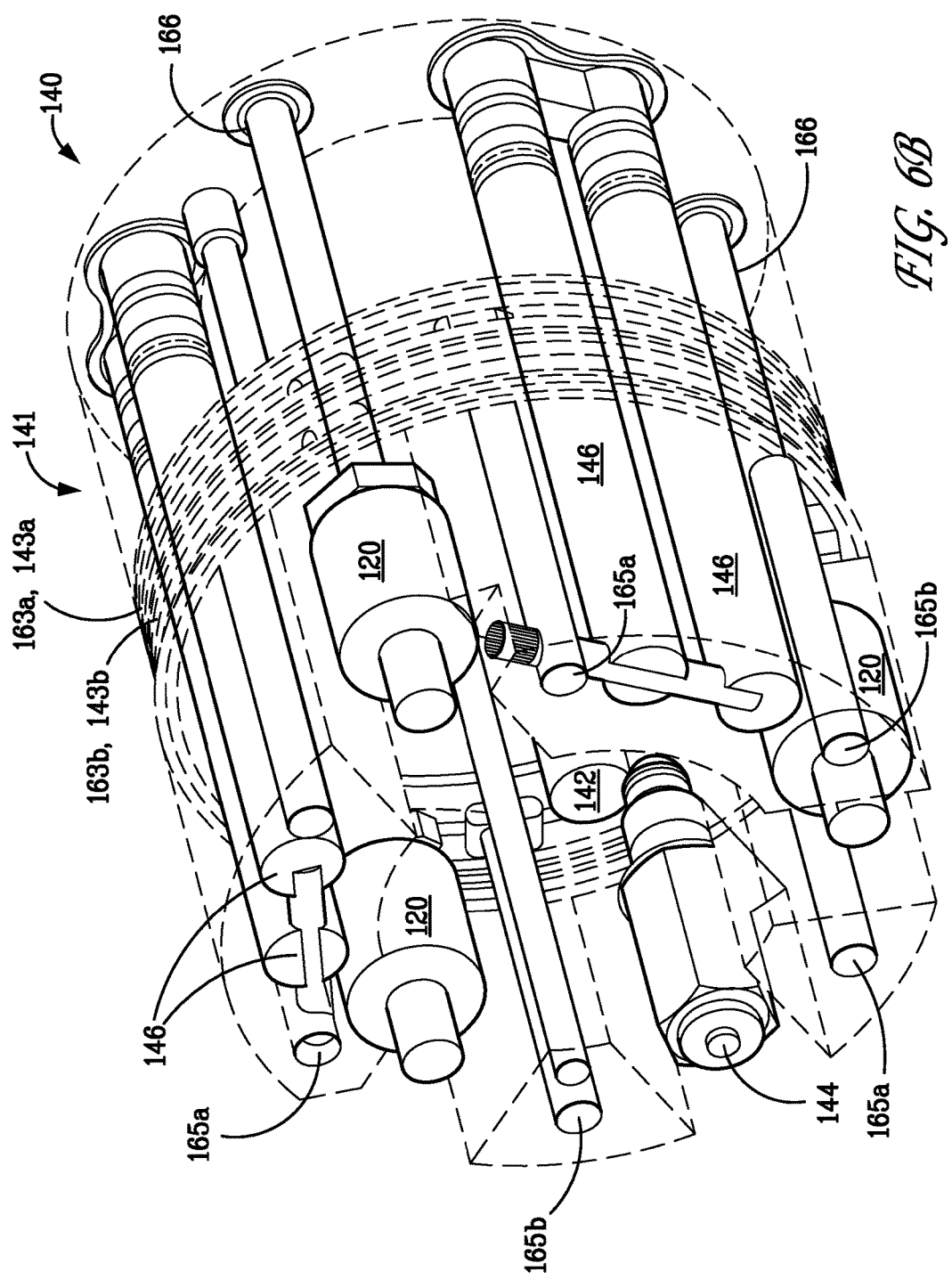
FIG. 6B is a perspective view of the hydraulic manifold assembly shown in FIG. 6A.
Figure 6C:
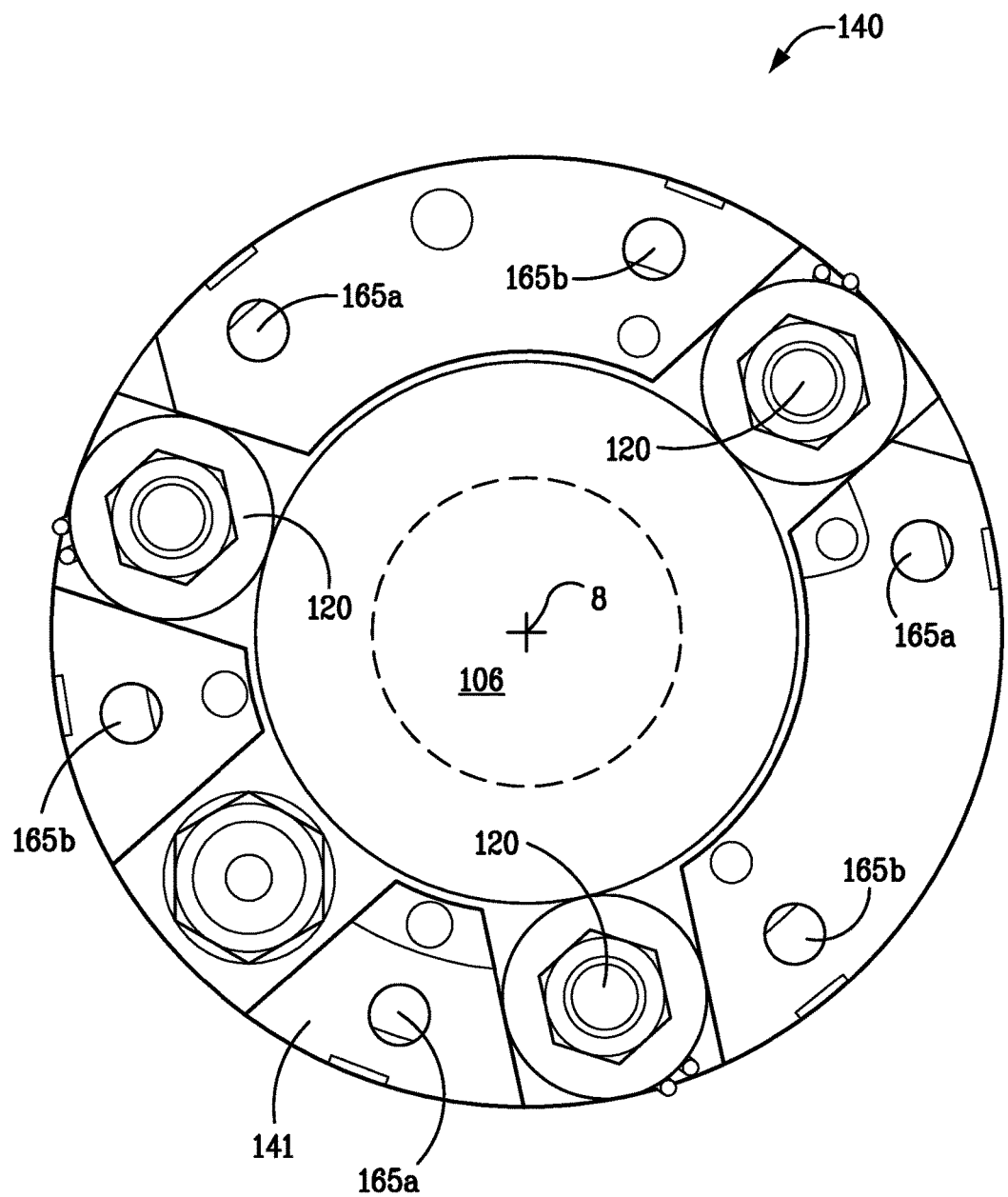
FIG. 6C is an end view of the hydraulic manifold assembly shown in FIGS. 6A-6B, from a perspective up-hole looking down-hole toward a drill bit.
Figure 6D:
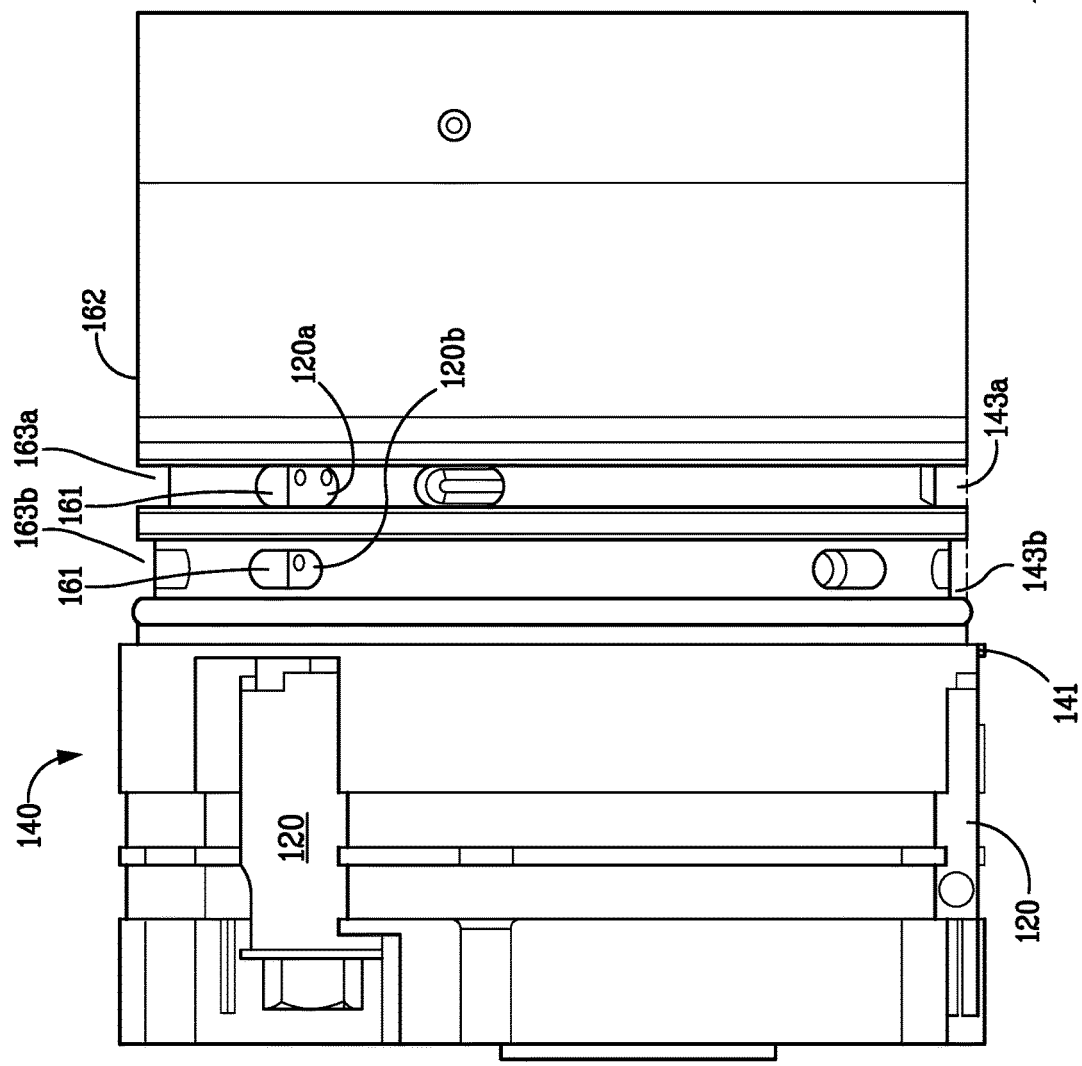
FIG. 6D is a side view of the hydraulic manifold assembly shown in FIGS. 6A-6C.

Continuing with FIG. 6A-6C, the body 141 of the hydraulic manifold assembly 140 has circumferentially-extending, outwardly-facing first and second grooves 163a, 163b formed therein. The first groove 163a and the overlying portion of the casing 162 define a first annulus 143a in the hydraulic manifold assembly 140. The second groove 163b and the overlying portion of the casing 162 define a second annulus 143a in the hydraulic manifold assembly 140. The first and second annuli 143a, 143b form part of the hydraulic circuit. The first annulus 143a is in fluid communication with the inlet ports 131a of the pump 114 by way of passages 165a formed in the body 14. The first annulus 143a therefore holds oil at a pressure approximately equal to the inlet pressure of pump 114 during operation of the RSM system 10. The second annulus 143b is in fluid communication with the outlet ports 131b of the pump 114 by way of passages 165b formed in the body 141. The second annulus 143b therefore holds oil at a pressure approximately equal to the outlet (discharge) pressure of pump 114 during operation of the RSM system 10.

Figure 9:
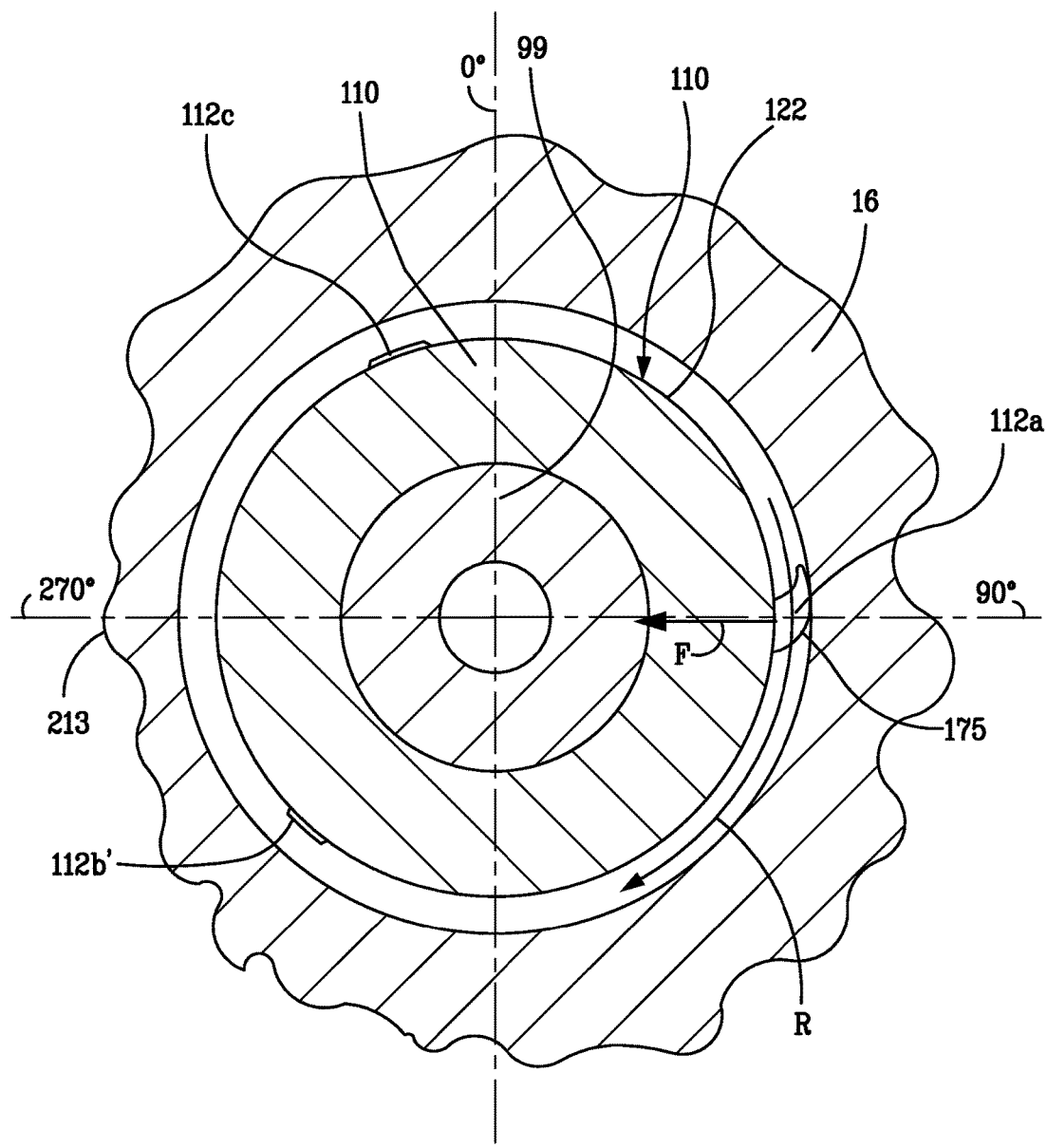
FIG. 9 is a cross sectional view of the rotary steerable motor system shown in FIG. 1, taken through the line "IV-IV" of FIG. 2.

Continuing with FIGS. 6A-6D, each valve 120 has a first inlet 121a and a second inlet 121b (see FIG. 9). The valves 120 are mounted on the body 141 so that the first inlet 121a communicates with the first annulus 143a by way of a port 161 formed in the body 141, and the second inlet 121b communicates with the second annulus 143b by way of another port 161 (see FIG. 6D). Accordingly, the first inlet 121a of each valve 120 is in fluid communication with the inlet of the pump 114 by way of the first annulus 143a and the second inlet 121b in fluid communication with the outlet of the pump 114 by way of the second annulus 143b. The first inlet 120a therefore is exposed to oil at a pressure approximately equal to the inlet pressure of the pump 114, and the second inlet 120b is exposed to oil at a pressure approximately equal to the discharge pressure of the pump 114. The body 141 has three passages 166 formed therein (see FIG. 6A). Each passage 166 is in fluid communication with the outlet of an associated valve 120, and extends to the down-hole end of the body 141. The passages 166 further define the hydraulic circuit.

Turning now to FIGS. 6A and 6B, the hydraulic manifold assembly 140 also includes four pistons 145. The pistons 145 are each disposed within a respective cylindrical bore 146 formed in the body 141. A down-hole end of each piston 145 is exposed to oil from the first hydraulic circuit, at approximately bore pressure. The up-hole end of each piston 145 is in fluid communication with the inlet of the pump 114. The pistons 145 therefore help to pressurize the oil at the inlet of the pump 114 to a pressure approximately equal to bore pressure.

The hydraulic manifold assembly 140 also includes one more accumulators 142 that serves as a reservoir of high-pressure oil in fluid communication with the second inlet 121b of the valves 120. As can be seen in FIG. 6A, the manifold assembly 140 includes two spring-loaded pistons 139 (see FIG. 6A that are disposed within a respective cylindrical bores (not shown) formed in the body 141. The portion of each bore located up-hole of the associated piston 139 is in fluid communication with the second annulus 143b, and therefore contains oil at a pressure approximately equal to the discharge pressure of pump 114. A down-hole end of each piston 139 is exposed to drilling mud at bore pressure, by way of various passages formed in the body 141 and the housing 122. The combined force of the drilling mud and the associated spring against the down-hole end of the piston 139 helps to maintain the pressure in the up-hole of the piston 139 above bore pressure. Each bore and its associated piston 139 thus define the accumulator 142 that stores a reservoir of high-pressure oil in fluid communication with the second inlet 121b of the valves 120. The optimal number of accumulators 142 is application-dependent, and can vary, for example, with the amount of force required to actuate the actuation assemblies 112. More than two or less than two accumulators 142 can be used in alternative embodiments. Other alternative embodiments can be configured without any accumulators 142.

Turning to FIG. 8A, the plurality of actuation assemblies 112 of the guidance module 110 are configured to selectively transition between the inactive configuration and the active configuration in response to fluid pressure changes in the RSM system 10 proximate the actuation assembly 112. More specifically, the arm member of the actuation assembly 112 can transition into the active configuration via actuators 154, configured as pistons, operatively coupled to the housing 122 and pump 114. The actuators 154 can be activated by regulating the flow of pressurized fluid from the discharge of the pump 114 to an area proximate the actuator 154. In accordance with the illustrated embodiment, the underside of each actuation assembly 112 is supported by an actuator 154 housed in a chamber 152 disposed in the guidance module housing 122. In a preferred embodiment, the chamber 152 is a cylinder. The actuator 154 is configured to translate in an actuation direction T in response to pressure of oil routed to the chamber 152. The actuation direction T is transverse to the central axis 8. Each actuator 154 includes an inner end that is exposed to the oil in its associated chamber 152 and an outer end that is opposite to the inner end (inner and outer ends not numbered). The outer end of the piston 154 contacts the underside of the associated arm member in the actuation assembly 112. Seals 157 are mounted on the housing 122 (or on the actuators 154) to seal the interface between the chamber 152 and the associated actuator 154 and thereby contain the high-pressure oil in the chamber 152. Thus, adequate pressure of oil in the chamber 154 applied against the inner end of the actuator 154 causes translation of the actuator 154 in the actuation direction T. Contact between the outer end of the actuator 154 and the underside of the arm 113 during translation of the actuator 154 causes the arm member assembly 112 to transition from the inactive configuration, where arm member is merely in contact with the borehole wall, into the active configuration, where arm member applies a force against the wall sufficient to cause a directional change in the drill bit.

Continuing with FIG. 8A, in accordance with the illustrated embodiment, the guidance module housing 122 is configured to support or carry the actuators 154 and route pressurized fluid from the manifold 140 to the chamber 152. The housing has multiple, for instance three, deep-drilled holes 150 that form part of the RSM hydraulic circuit. Each hole 150 is substantially aligned with, and is in fluid communication with an associated one of the passages 166 (FIG. 6A) in the body 141 of the hydraulic manifold assembly 140 and thus is in flow communication with the respective valve 120. Each hole 150 extends in a downhole direction D from the manifold passages 166 to the chamber 152 at a position that is proximate a respective actuation assembly 112. The housing 122 also includes multiple banks 151 of chambers 152 formed therein. The banks 151 are circumferentially spaced at intervals of approximately 120 degrees about the central axis 8 of the RSM system 10. Thus, each bank 151 is aligned with a relative position of the actuation assemblies 112 about the central axis 8 such that the banks 151 are each positioned beneath a respective arm member of each actuation assembly 112. The chambers 152 preferably are oriented at an angle of approximately ninety degrees in relation to the radial direction of the housing 122 (see FIG. 8A). In other words, the longitudinal axis of each chamber 152 preferably is disposed at an approximate right angle in relation to a reference line that extends radially outward from the centerline of the housing 122 and intersects the chamber 154. The feature helps to maximize the length of chambers 152, the stroke of the actuators 154, and the actuation force generated by the actuator 154. Each hole 150 is in fluid communication with a respective bank 151. In other words, the three chambers 152 in each bank 151 are supplied with oil from an associated hole 150. The chambers 152 each receive the respective actuator 154 as noted above. The diameter of the each piston 154 is sized so that the piston 154 can translate in the actuation direction T, which is substantially coincident with the central longitudinal axis (not shown) of its associated chamber 152. In response to commands from the controller 118, each valve 120, as discussed below, selectively routes relatively high-pressure oil from the discharge of the pump 114, through the passages 166, to an associated hole 150, and into the chamber 152, thereby causing translation of the actuator 154.

As described above, the valves 120 are in flow communication with the banks 151 and thus are operably connected to the respective actuation arms 112 via the actuators 154. The valves 120 can be selectively energized via the controller 118 to place either low or high-pressure fluid from the pump 114 in flow communication with the actuators 154 disposed in the chambers 152. The valves preferably are double-acting spool valves. As noted above, the valve inlets 121a, 121b are in fluid communication with the inlet and outlets of the pump 114. The valve outlet is in fluid communication with a respective one of the holes 150, by way of the passages 166. The valve 120 permits relatively low-pressure oil from the inlet of the pump 114 to enter the associated hole 150 when the valve 120 is not energized. In other words, the valve 120 places the associated hole 150 and bank 151 in fluid communication with the inlet of the pump 114 when the valve 120 is not energized. Because the relatively low-pressure oil from the inlet of the pump 114 is insufficient to cause the actuation assembly 112 to apply a force against the borehole wall that is sufficient to cause steering change, the actuation assembly 112 remains in the inactive configuration. Conversely, when the valve 120 is energized, the valve 120 permits the relatively high pressure oil from the outlet of the pump 114 to enter the associated hole 150 thereby routing the high pressure fluid to the chamber 152. This in turn causes the actuator 154 to translate in the translation direction T transitioning the assembly 112 into the active configuration, thereby by applying the second force to the borehole that causes a directional change in the drill bit.

As can be seen in FIG. 8A, each actuation arm of the actuation assembly 112 can be pivotally coupled to the guidance module housing 122 so that the actuation assembly 112 can pivot between an initial position where arms are at rest, for instance during shipment of the RSM system to the drill site or during make-up operation, and an extended position. Thus during a drilling operation, the arms are disposed in the extended position in contact with the borehole wall and are configured to transition between the inactive and active configurations. For instance, at some point, the arm members are extended yet remain in the inactive configuration until a directional change is needed. Recesses 160 are formed in the housing 122 accommodates an associated actuation assembly 112. All three of the actuation assemblies 112 are shown in their active configurations in FIG. 8, for illustrative purposes only. Typically, only one of the actuation assemblies 112 is in the active configuration at one time, as discussed below. In accordance with the illustrated embodiment, the actuation assembly 112 can be pivotally coupled to the guidance module housing 122 by a pin 158. Ends of the pin 158 are received in bores (not numbered) formed in the housing 122, and are retained by a suitable means such as clamps. Each actuation assembly 112 can be biased toward the inactive configuration by a torsional spring (not shown) disposed around the corresponding pin 158. Thus, the arms 112 are normally in the a retracted, inactive configuration when the pump is not operating to facilitate ease of handling as the RSM system 10 is lowered into and raised form the bore 17. While the actuation assemblies 112 are illustrated as being pivotally coupled to the housing, in alternative embodiment, the actuation arms can be translatably coupled to housing 122.

Accordingly, the controller 118, in response to inputs, is configured to energize the valve 120 or de-energize the valve 120. Energizing the valve 120 activates a solenoid within the valve 120 that reconfigures the flow path within the valve 120 so that the outlet of the valve 120 is placed in fluid communication with the outlet of the pump 114 by way of the second inlet 120b of the valve 120. As noted above, energizing the valve 120 causes relatively high-pressure oil from the pump 114 to act against the inner end of the actuator 154, and causes the actuator 154 to move outwardly against the arm member of the actuation assembly 112. The restraint of the actuation assembly 112 exerted by the associated pin 158 causes the actuation assembly 112 to pivot slightly about the pin 158, toward so as to cause the force applied against the borehole wall to increase, thereby attaining the active configuration. The valves 120, therefore when energized, subject the associated holes 50 and the cylinders 152 to a hydraulic pressure approximately equal to the discharge pressure of pump 114. De-energizing the valve 120 causes the solenoid to reconfigure the flow path within the valve 120 so that the valve output is in fluid communication with the inlet of the pump 114 by way of the first inlet 121*a*. Because the relatively low-pressure oil from the inlet of the pump 114 is insufficient to maintain application of the second force applied by associated actuation assembly 112 against the borehole wall, the actuation assembly 112 exerts no steering force against the borehole wall, although it may either remain in contact in an the inactive configuration or retract to its retracted position. Thus, the valves 120 respond to control signals transmitted from the controller 118 to reconfigure the flow path in order to supply high or low pressure oil to chambers 152. The controller 118, is configured to activate the valves 120 for an extended period to cause the assembly 112 to apply the second force for the desired or expected dwell angle. The desired dwell angle is the dwell angle of the assembly 112 that can affect directional control of the drill bit toward the predetermined drilling direction.

Each actuation assembly 112 is configured to contact the surface of the bore 17 during the drilling operation as discussed above. Each arm includes an outwardly facing surface portion 175 that is configured to contact the surface of the bore 17, i.e., the borehole wall, and exerts a force thereon in a first direction 171 (FIG. 9) when the actuation arm is in the active configuration. When the assembly 112 contacts the surface of the bore 17, the surface of the bore 17 exerts a reactive force F on the actuation assembly 112 in a second direction 172 that is substantially opposite the first direction. The reactive force F urges the drill bit 13 substantially in the second direction 172 thereby effecting the direction of drilling. As will be further detailed below, the actuation arms 112 can be selectively extended outward to selectively apply differing forces against the surface of the bore 17 during a portion of a revolution of the drill string 12 to guide the drill bit 13. The surface portion 175 of the actuation assembly 112 preferably is curved to match the curvature of the surface of the bore 17 (see FIG. 8A). This feature causes the reactive contact forces to be distributed over a relatively large area on the actuation assembly 112, and can thereby help to reduce wear of the actuation assembly 112. Further, the arm members of the actuation assemblies 112 preferably are formed from a relatively hard, wear-resistant material capable of withstanding the contact forces generated when the actuation assembly 112 contacts the borehole wall. For example, the arm member arms can be formed from 17-4PH stainless steel, or other suitable materials. A wear coating, such as a tungsten carbide coating (or other suitable coatings) can be applied to the surfaces of the arm members and the pistons 154 to provide additional durability.

The bypass valve 144 is configured to route the discharge of the pump 114 to the inlet of the pump 114 when the pressure of the oil in the manifold 143 exceeds a predetermined value. The bypass valve 144 can accomplish this bypass function by placing the first and second annuli 143*a*, 143*b* in fluid communication so that oil can flow from the second annulus 143*b* to the first annulus 143*a*. The predetermined value should be chosen so that the bypass valve 144 performs its bypass function when none of the three valves 120 is activated, i.e., when outlet of pump 114 is not in fluid communication with any of the cylinder banks 151. This feature can reduce the potential for deadheaded oil to cause an overpressure condition in the third hydraulic circuit.

Alternative embodiments of guidance module 110 can include more, or less than three actuation assemblies 112, actuators 154 and banks 151. Moreover, each bank 151 can include more, or less than three chambers 152 in alternative embodiments. The actuation assemblies 112 and banks 151 can be circumferentially spaced in unequal angular increments in alternative embodiments.

The guidance module 110 includes several electrical components used to operate and/or control the RSM system 10. The guidance module electrical components include the controller 118, an alternator 180, a rectifier and voltage regulator, wiring (not shown), and a transducer 220. The controller 118 is mounted in a cavity 201 formed in the housing 122 (see FIG. 8B). The cavity 201 is covered and sealed by a hatch cover 202.

The alternator 180 generates electrical power for the controller 118 and the other electrical components of the RSM system 10. The alternator 180 is mounted on the housing 122, within a cavity 182 formed in the housing 122. The cavity 182 is covered and sealed by a hatch cover 184 (see FIGS. 2, 6, and 14). The alternator 180 preferably is a three-phase alternator that can tolerate the temperatures, pressures, and vibrations typically encountered in a downhole drilling environment. The alternator 180 is driven by the lower drive shaft 99, by way of a gear train 186. The gear train 186 is mounted on the housing 122, within the cavity 182. A portion of the lower drive shaft 99 has teeth 188 formed thereon (see FIG. 6). The teeth 188 engage a complementary gear of the gear train 186, so that rotation of the lower drive shaft 99 in relation to the housing 122 causes the teeth 188 to drive the gear train 186. Preferably, the gear train 186 is configured to drive the alternator 180 at a rotational speed approximately thirteen times greater than the rotational speed of the lower drive shaft 99. The cavity 182 is filled with oil from the hydraulic circuit. The oil lubricates the alternator 180 and the gear train 186. The oil reaches the cavity 182 by way of various passages and clearances within the guidance module 110 and other components of the RSM system 10.

The guidance module 110 also includes a voltage regulator board 204 (see FIGS. 5 and 11) mounted in a cavity 206 formed in the housing 122. The cavity 206 is covered and sealed by a hatch cover 208. The voltage regulator board 204 comprises the rectifier and a voltage regulator. The rectifier receives the alternating current (AC) output of the alternator 180, and converts the AC output to a direct current (DC) voltage. The voltage regulator regulates the DC voltage to a level appropriate for the controller 118 and the other electrical components powered by the alternator 180.

Guidance module wiring (not shown) that interconnects the alternator 180 with the voltage regulator board 204 is routed through a pressure header 215, and through a passage 216 formed in the housing 122 between the cavities 182, 206 (see FIG. 5). The header 215 isolates the pressurized oil in the cavity 182 from the air at atmospheric pressure within the cavity 202.

The guidance module 110 also includes the short-hop circuit board and a transducer 220 (see FIG. 11). The short-hop circuit board and transducer 220 is communicatively coupled to the controller 118 via wiring (not shown). The short-hop circuit board and transducer 220 facilitates communication between the controller 118 and the controller 322 of the mud-pulse telemetry system 30, via short-range telemetry. The short-hop circuit board and transducer 220 is mounted in a cavity 222 formed in the housing 122. The cavity 222 is covered and sealed by a hatch cover 224.

The guidance module 110 also includes a valve control and magnetometer board 226 (see FIG. 11). The valve control and magnetometer board 226 is mounted in a cavity 228 formed in the housing 122. The cavity 228 is covered and sealed by a hatch cover 230. The valve control and magnetometer board 226 is communicatively coupled to the controller 118 by wiring (not shown), and energizes the valves 120 in response to commands from the controller 118. The valve control and magnetometer board 226 can also include a biaxial magnetometer that facilitates calculation of tool face angle, as discussed below.

Figure 10:
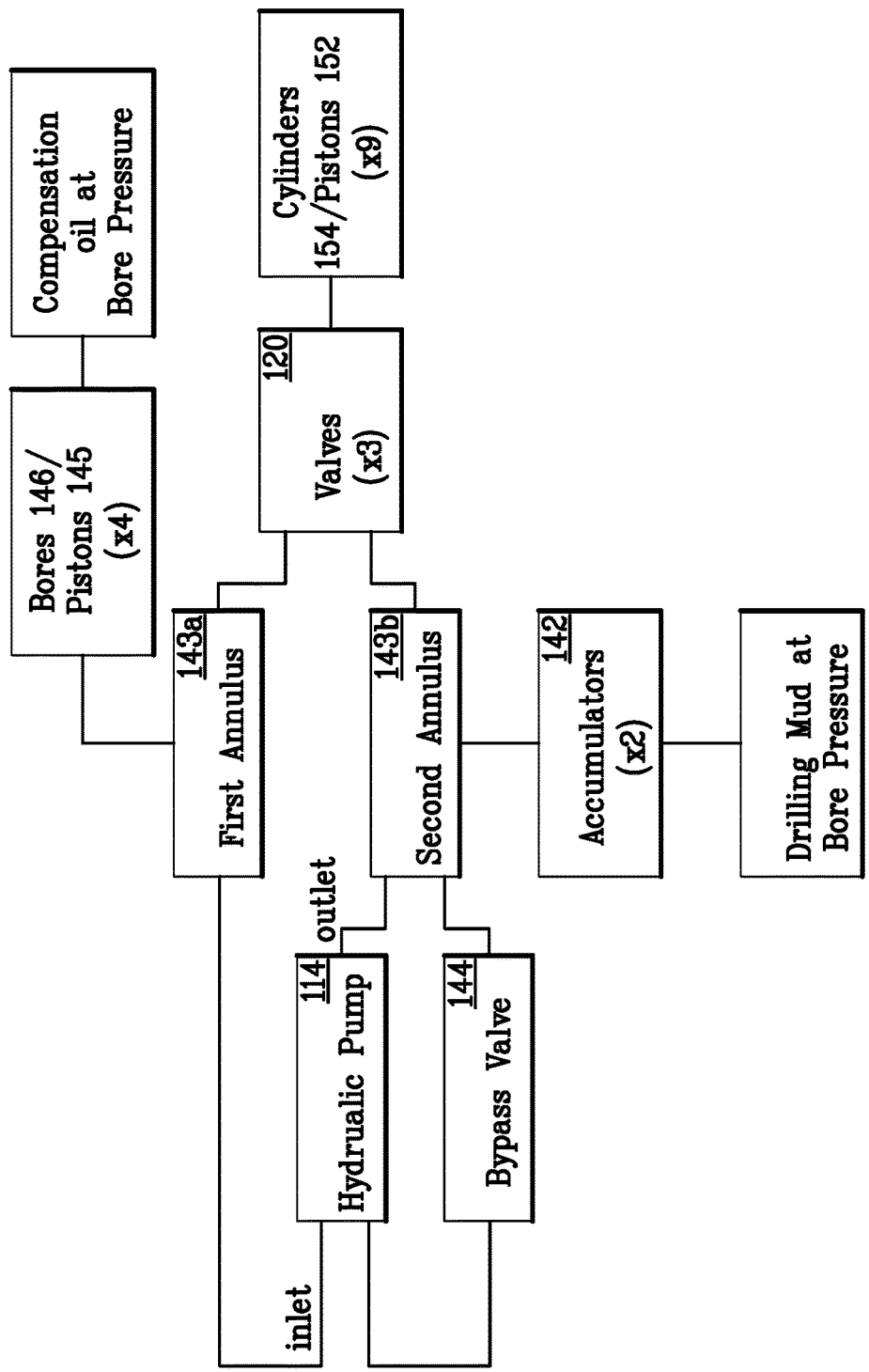
FIG. 10 is a block diagram depicting a portion of a hydraulic circuit of the rotary steerable motor system shown in FIG. 1.

Various components of the RSM system 10 have been described above. The present disclosure relates to an embodiment of the RSM system 10 that is similar to the RSM system described in U.S. Pat. No. 7,389,830 (the 830 patent), the entire contents of which are incorporated by reference into the present disclosure. Thus, the RSM system 10 can also include other components. For instance, according to one embodiment, the RSM system 10 can include the flexible coupling (a portion of which shown in FIG. 3 as element 29), a drilling fluid diverter (not shown) downhole from the flexible coupling, and a stabilizer 50 (FIG. 2). The stabilizer 50 (FIG. 2) includes a body 51 with three or more static blades 52 that position the bottom hole assembly 11 in the relative center of the borehole 17. The RSM system 10 can also include an upper compensation and seal bearing assembly 70 (FIG. 5), a cross-over assembly 100 (FIG. 5) couples the compensation and seal bearing assembly 70 to the guidance module 110, and a lower seal bearing pack assembly 280 (FIG. 5) just uphole of the bit box 105. The RSM system can also include a thrust bearing assembly 176 and a spacer 178 are mounted between a lip formed on the housing 122 of the guidance module 110 and a neck 99a of the lower drive shaft 99 (see FIG. 5). The thrust bearing 176 transfers axial loads between the lower drive shaft 99 and the housing during drilling operations. The RSM system 10 can include a fluid circuit comprising multiple passages that facilitate flow of fuilds through the various RSM system components to facilitate operation of the RSM system 10. This fluid circuit can be further described as a hydraulic circuit, a portion of which is illustrated in FIG. 10. It should be appreciated, however, the 830 patent describes an exemplary RSM system 10. The present disclosure can be used with variations and/or alternate configurations the RSM system described in the 830 patent.

Continuing with FIGS. 8A and 9, because the guidance module 110 forms part of the drill string 12, the guidance module housing 122 and the attached actuation assemblies 112, rotate in response to the torque exerted on the drill string 12 by the drilling rig 15 in a rotational direction R (FIG. 8A). As the drill string 12 rotates in the rotational direction R, the actuation arms are selectively activated by energizing and de-energizing the associated valves 120, as discussed above. The controller 118 includes a processor (not numbered) that is configured to determine the instantaneous angular orientation of each arm member of the actuation assembly 112 based on the tool face angle of the housing 122. The controller 118 includes memory portion with algorithms stored thereon that, when executed by the processor, cause the controller 118 to energize and de-energize each valve 120 as a function of the angular position of the arms 112. The controller 118 is configured to determine the angular positions at which the valves 120 are energized and de-energized based on the predetermined drilling direction, and the lag between when the valve 120 is energized and when the actuation assembly 112 is fully in the active configuration.

Continuing with FIG. 9, the drill bit 13 can be guided toward the desired drilling direction by actuation of arms during rotation of the drill string 12. FIG. 9 depicts a borehole with 0°, 90°, 180°, and 270° positions denoted. Each angular position can refer to direction, such as 0°, 90°, 180°, and 270° directions that typically perpendicular the RSM system central axis 8 and borehole axis 9. The selection 0°, 90°, 180°, and 270° positions and directions are for illustrative purposes only. In accordance with the illustrated embodiment, the first of the actuation assemblies 112a in its active configuration to urge the drill bit 13 in the 270° direction. The second actuation assemblies 112b is located at about the 210° position, since the actuation assemblies 112 are spaced apart in angular increments of approximately 120°. The third actuation assembly 112c is located at the 330° position. The second and third actuation assemblies 112b, 112c are in the inactive configuration at this point (actuation assemblies 112b, 112c are illustrated retracted for illustrative purposes, the actuation assemblies 112b, 112c are extended but in the inactive configuration), and therefore do not exert any substantial forces on the borehole wall. The drill bit 13 can be guided in the 270° direction, or a second direction 172, by actuation each the first actuation assembly 112a so that the actuation assembly 112a is in the active configuration along the first direction 171 as it passes the 90° position. The resulting contact between the extended, first actuation assembly 112a and the borehole wall causes the wall to exert the reactive force F that acts in the second direction 172 substantially opposite the 90° position. In other words, the force F acts substantially in the second direction toward the 270° position. The force F is transferred to the housing 122 through the first actuation assembly 112a and its associated pin 158. The force F is subsequently transferred to the drill bit 13 by way of the drive shaft assembly 31, and the various bearings that restrain the drive shaft assembly 31. The force F thereby urges the drill bit 13 in the 270° direction, thereby guiding the drill bit 13 toward and along the predetermined drilling direction.

Since the drill string 12 can rotate at a relatively high speed (250 rpm or greater), the actuation assemblies 112a-112c should be activated for a precise dwell angles and inactivated in a precise, rapid sequence, so that the actuation assemblies 112a-112c push the drill bit 13 in the desired direction. In the example depicted in FIG. 9, the first actuation assembly 112a should begin transition into the inactive configuration immediately after reaching the 90° position so that force F acts primarily in the desired direction, i.e., in the 270° direction. The third actuation assembly 112c should begin activation at a predetermined distance from the 90° position, so that the third actuation assembly 112c is fully activated upon reaching the 90° position. The second actuation assembly 112b should also begin activation at a predetermined distance from the 90° position, so that the second actuation assembly 112b is fully activated upon reaching the 90° position. The predetermined distance is a function of the lag time between the activation of the associated valve 120, and the point at which the actuation assembly 112 reaches its fully active configuration. The lag time is application dependent, and can vary with factors such as the discharge pressure of the pump 114, the size and weight of the actuation assemblies 112, the size of the holes 150 and cylinders 152, etc. A specific value for the predetermined distance therefore is not specified herein. It should be appreciated, that the valves 120 can be activated by the controller 118 based on various operational inputs regarding the RSM system 10. For instance, the controller 118 can cause the valve 120 to subject the actuator 154 to relatively high hydraulic pressure for a period of time such that assembly 112 is in the activated configuration for the required dwell angle.

As noted above, the RSM system 10 can be configured to cause activation of the actuation assemblies 112 as needed, but may not cause the assembly 112 to remain in the activated configuration for the desired dwell angle. For instance, the operational efficiency of the RSM system 10 can degrade over time, or over the period of the drilling operation. When the controller 118 causes the respective assembly 112 to be active for an expected dwell angle, but for various reasons, the arm is not fully active or in contact with borehole wall for the expected dwell angle, less than optimal directional control of the drill bit 13 results. Thus, the actual dwell angle of assembly 112 can vary from the expected dwell angle of assembly 112. The difference between the actual dwell angle and the expected dwell angle can be due to an increase in the lag time from when the valve is energized and the arm member is in the activate configuration due to operational inefficiencies in the RSM system. Further, pressure in pump 114 can decrease over time causing the less than expected pressures cause the arms 112 to exert the desire force when in the activated configuration. For instance, pressure in pump 114 can decrease over time as the pump 114 wears and seals degrade. Because a pump 114 with decreased pressure will result in lower than intended or desired pressure for acting against the arms 112, the arms 112 will not remain in the active configuration for the period as expected so that the desired dwell angle of the arm will decrease.

As will be further detailed below, the controller 118 is configured to, based on a measured operating parameter of the rotary steerable motor system 10 during actuation of the assembly 112, adjust the extent of the portion of each revolution that the one arm is in the active configuration during rotation of the drill string 12. The extent of the portion of a revolution that the arm is in the active configuration is referred to as the dwell angle. In a preferred embodiment, the three arms 112a, 112b, and 112 are disposed at 120-degree intervals about the central axis 9, and the dwell angle is typically no greater than 120 degrees. In embodiments when the actual dwell angle needs to be increased, the controller 188 can adjust the increase the dwell angle toward 120 degrees.

The measured operating parameter can be any one of a number of RSM system 10 operation parameters that are measurable. In a preferred embodiment, the measured operating parameter can be a differential pressure across the pump 114 during actuation of arm as recorded by the pressure sensor assembly 138 (FIGS. 7A and 7B). The controller 118 is configured to determine if the differential pressure is less than a predetermined value. If the differential pressure is less than the predetermined value, the controller 118 can cause an increase the dwell angle of the actuation assembly 112. In another embodiment, the operating parameter can be an efficiency activation of the actuation assembly during each revolution of drill string 12. The efficiency can be a ratio of 1) an actual portion of each revolution that actuation assembly 112 is in contact with the wall and in the active configuration, i.e. the actual dwell angle, and 2) an expected portion of each revolution that the arm is in contact with the wall in the active configuration, i.e. the expected dwell angle. The actual well angle can be determined utilizing a position sensor that can detect the position of the arm. For instance, the actuator 154 can include a pressure gauge along its upper end that can detect when the pressure applied to the arm is above or below a threshold value and for how long. The controller 118 is configured to determine if the efficiency is less than a predetermined value. If the efficiency is less than the predetermined value, the controller 118 can cause an increase in the dwell angle of the assembly 112. In yet another embodiment, the measured operating parameter can also be the lag time between valve actuation and the when the assembly 112 is in the active configuration. The controller 118 is configured to determine if the lag time is less than a predetermined value. If the lag time is less than the predetermined value, the controller 118 can cause the dwell angle of the assembly 112 to increase.

Referring to FIGS. 1 and 11, the drilling system 1 can include the MWD tool 30, which is configured to obtain directional drilling information. The MWD tool 30 can be attached to or suspended within the drill string 12 at a location up-hole of the rotary steerable motor system 10. The MWD tool 30 can include a plurality of sensors for measuring azimuth and inclination of a tool, such as the drill bit or other components of the bottom hole assembly 11. Further the MWD tool sensors obtain information that used to determine tool face or tool face angle of a drill bit or a particular component of the bottom hole assembly. Tool face, azimuth, and inclination, can be collectively referred to as drilling direction information. The drilling direction information can obtained during a drilling operation is used to direct the rotary steerable motor system 10 along the predetermined drilling direction in accordance with the well plan. In particular, the MWD tool 30 can include three magnetometers 32 for measuring azimuth about three orthogonal axes, three accelerometers 34 for measuring inclination about the three orthogonal axes, and a processor 36 (see FIG. 17). The signal processor 36 is configured to, in response to receiving measurements obtained from the magnetometers 32 and the accelerometers 34, determine the angular orientation of a fixed reference point on the circumference of the drill string 12 in relation to a reference point on the bore 17. The reference point is typically north in a vertical well, or the high side of the bore in an inclined well during steering mode or tangent angle hold modes. This orientation is typically referred to as the "tool face" or "tool face angle." The processor 36 is configured to determine gravitational tool face (GTF) and the magnetic tool face (MTF) based on the azimuth and inclination measurements obtained from the magnetometers 32 and accelerometers 34. The MWD tool 30 also includes a short-hop telemetry device 38 that facilitates communication with the both the rotary steerable motor system 10 and telemetry system 40 via short-range radio telemetry.

The MWD tool 30 can conduct a survey such that sensors obtain data indicative of the drilling direction. For instance, the sensors 32 and 34 obtain directional drilling data. The signal processor 36 is configured to calculate tool face angle based on the drilling data that is indicative of azimuth and inclination. Alternatively, tool face angle can be calculated based on the techniques described in U.S. Pat. No. 7,681,663, entitled "Method and Systems for Determining Angular Orientation of a Drill String," the contents of which is incorporated by reference herein in its entirety. The calculated tool face angle can be transmitted from the processor 34 to the controller 118 by way of the short-hop telemetry device 38 and the short-hop circuit board and transducer 220.

Continuing with FIGS. 1 and 11 and in accordance with the illustrated embodiment, the telemetry system 40 is a mud-pulse telemetry system 40 (FIGS. 1 and 11). The mud-pulse telemetry system 40 comprises a controller 42, a pulser 44, a pressure pulsation sensor 46, and a flow switch, or switching device 48. The controller 42 can be configured to store data received from the controller 118 and the other components of the RSM system 10, and/or surface control system 20. The pulser 44, as described below, is used to transmit signals through the drilling mud. The switching device 48 senses whether drilling mud is being pumped through the drill string 12. The switching device 48 is communicatively coupled to the controller 42. Further controller 42 can store data when drilling mud is not being pumped, as indicated by the output of the switching device 48. A suitable switching device 48 can be obtained from APS Technology, Inc. as the FlowStat™ Electronically Activated Flow Switch.

The telemetry system 40, as discussed below, can transmit information between the bottom hole assembly 11, and in particular the RSM system 10, and the surface system control system 20. While a mud-pulse telemetry system 40 is illustrated, it should be appreciated that other telemetry systems can be used to transmit information from the bottom hole assembly 11 to the surface control system 20. For example, the telemetry system can be electromagnetic telemetry, acoustic telemetry, or wired pipe systems. In accordance with the illustrated embodiment, the telemetry system 40 can transmit information obtained downhole to the surface control system 20. The telemetry system controller 42 can encode the information it receives from the controller 118 (or MWD sensors) as a sequence of pressure pulses. The controller 43, in response to inputs received from the RSM controller 118 for example, can cause the pulser 44 to generate the sequence of pulses in the drilling mud. A strain-gage pressure transducer (not shown) located at the surface can sense the pressure pulses in the column of drilling mud, and can generate an electrical output representative of the pulses received from the downhole pulser 44. The electrical output of the transducer at the surface can be transmitted to the surface control system 20, which can decode and analyze the data originally encoded in the mud pulses. The drilling operator can use this information, in conjunction with predetermined information about the earthen formation 16, the length of the drill string 12 that has been extended into the bore 17, and the directional drilling information obtained during the MWD surveys, to determine whether, and in what manner, the direction of drilling should be altered.

The telemetry system 40 can also transmit information from the surface to downhole tools, including the MWD tool 30 and RSM system 10. In an embodiment, surface pulsers (not shown) located at the surface can generate pressure pulses in the column of drilling mud within the drill string 12 in a direction toward the downhole portion of the telemetry system 40. Thus, commands from the surface control system 20 to initiate a MWD survey can be encoded in the pressure pulses and transmitted down hole. In addition, directional commands for the RSM system 10, or other commands related operation of the drilling system downhole, can be encoded in these pulses, based on inputs from the drilling operator. In particular, the pressure pulsation sensor 46 can sense the pressure pulses transmitted from the surface pulser, and can send an output to the controller 42 as a signal that is indicative of the sensed pressure pulses. A suitable pressure pulsation sensor is disclosed in U.S. Pat. No. 6,105,690 (Biglin, Jr. et al.), which is incorporated by reference herein in its entirety. The telemetry system controller 42 can be programmed to decode the information encoded in the pressure pulses received from the surface. Based on the decoded information, information can be transmitted to the MWD processor 34, and/or the RSM controller 118 via the short-hop telemetry device 48. For instance, the decoded directional drilling commands can be relayed to the controller 118 via the short-hop telemetry device 38 and the transducer 220. In response to receiving decoded directional drilling commands, the controller 118, for instance, can direct the drill bit 13 in a direction commanded by the drilling operator. In case where the operator initiates the MWD survey during a stoppage, the controller 42 causes MWD tool commands to be transmitted to the MWD processor 34.

Figure 12:
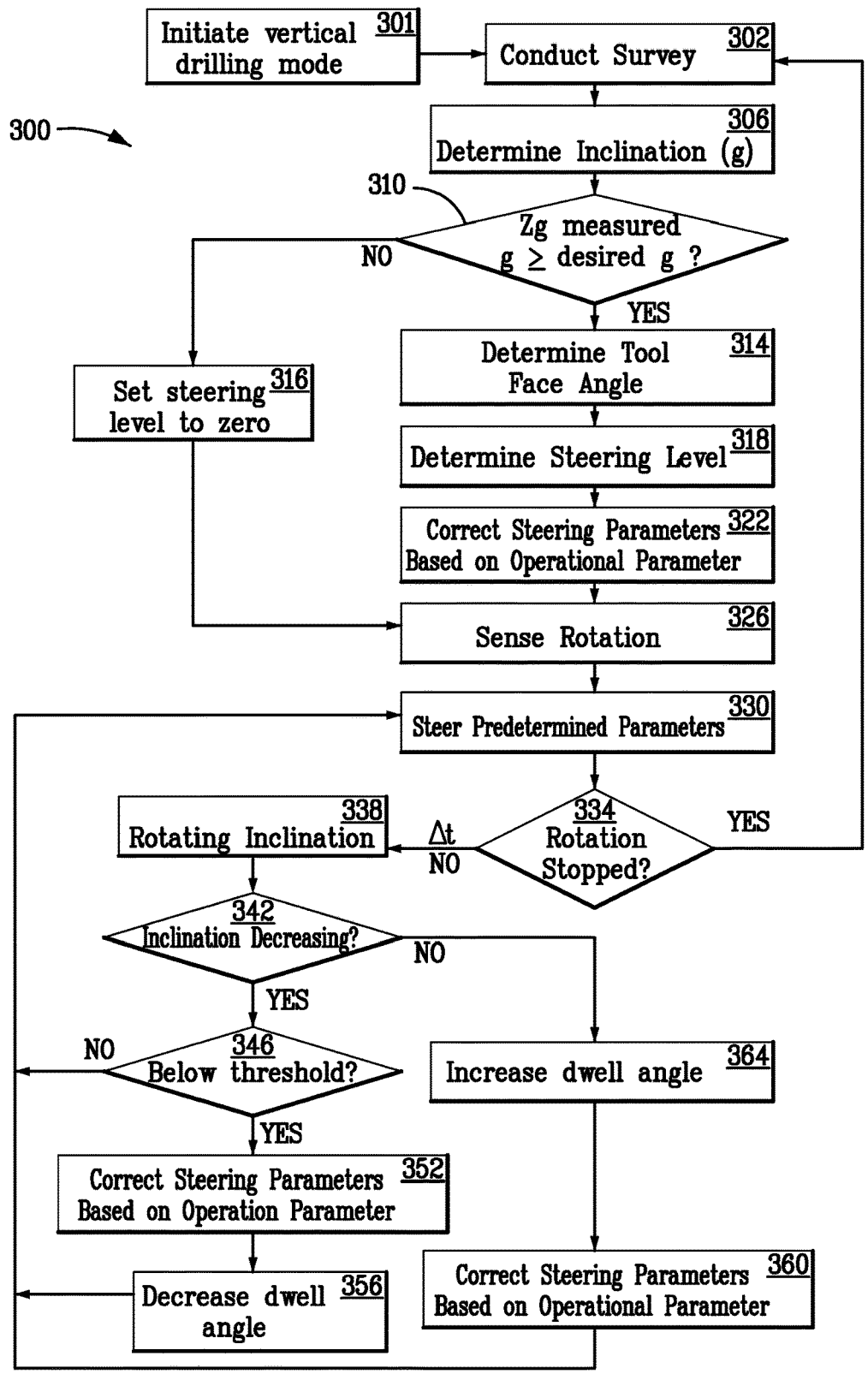
FIG. 12 is a process flow diagram illustrating directional control of the drilling system shown in FIG. 1 during a vertical drilling mode.

Turning now to FIGS. 11 and 12, the drilling system 1 can include one or more control systems operatively and communicatively coupled so as to guide the drill bit 13 along the determined drilling direction during the vertical, steering and tangent angle hold phases of the drilling operation. The drilling system 1 can include the surface control system 10, a downhole control system (not numbered) and the RSM control system 190.

The surface control system 20 includes one or more computing devices communicatively coupled to the MWD tool 30 and RSM system 10 via telemetry system 40. The surface computing device can including a processor, memory, input and output portions. The well plan can be stored in memory such that the surface processor is configured to cause various components of the drilling system 1 to operate according the well plan and operator input.

The downhole control system can include a controller 118 of the RSM system 10, short-hop telemetry devices 38, and MWD tool processor 36, as well as the downhole components of the telemetry system 40 located downhole and at the surface, such as receivers and the like.

The RSM control system 190 can include the controller 118 and one or more sensors housed in the RSM system. The control system 190 can also include the transducer 220 configured to receive and transmit signals from and to other components of the drilling system 1 such as the short-hop telemetry device 38. In accordance with the illustrated embodiment, the RSM sensors include the pressure sensor assemblies 138 disposed at input and outputs of the pump 114 as described above. Other sensors, such as arm position sensors or pressure gauges, and system clocks, can be used to obtain operational parameters for the RSM system 10 can be in electronic communication with the controller 118. The RSM controller 118 can be a micro-controller that includes a RSM processor (not numbered), RSM memory, and input and output portions configured to communicate with the sensors 38, the short-hop transducer 220, and valves 120 and other components of the RSM system 10 (as illustrated in FIG. 11).

The RSM processor is configured to, in response to inputs received from the RSM sensors, MWD tool sensor, and/or surface control system 20, adjust the steering parameters of the RSM system 10. More specifically, though not exclusively in this manner, the RSM processor is configured to adjust the duration that valve 120 is energized so that the high-pressure fluid is directed to the actuator 154, thereby causing the actuation assemblies 112 to extend for the desired dwell angle.

As noted above, the drilling direction of the drill bit 13 can be adjusted based on operator inputs received from the surface control system 20 that are transmitted downhole to the RSM system 10. However, in other alternative embodiments, the surface control system 20 can be configured to automatically adjust the drilling direction based on information received from the downhole tools via the telemetry system 40. That is, the surface control system 20 can, based on inputs regarding directional drilling information obtained downhole and/or information regarding well plan stored in the computer memory at the surface control system, adjust the drilling direction as needed. For instance, the surface control system 20 can determine that vertical drilling section 17v (FIG. 1) is complete and cause the RSM system 10 to operate in a steering mode. Further, when the desired drilling direction is obtained for the drill bit 13 during steering mode, the surface control system 20 can cause the RSM system 10 to operate in tangent angle hold mode so as to drill the offset section 17o of the borehole 17 (FIG. 1). In addition, the surface control system 20 can be configured to adjust the steering parameters of the RSM system 10 based on inputs obtained downhole via the MWD tool 30. For instance, the surface control system 20 can adjust the steering parameters if the drilling direction as indicated by azimuth and inclination are outside of a predetermined range of values. In still other alternative embodiment, the controller of the RSM system 10 can be configured to autonomously direct drilling direction based on the measured directional information obtained from the MWD tool 30 and the operation parameters detected by the various RSM sensors, such as, e.g., the pressure sensor assembly 138. The RSM system 10 as described herein is therefore configured to self regulate drilling direction based on the particular operational parameter of the RSM system 10.

Figure 13:
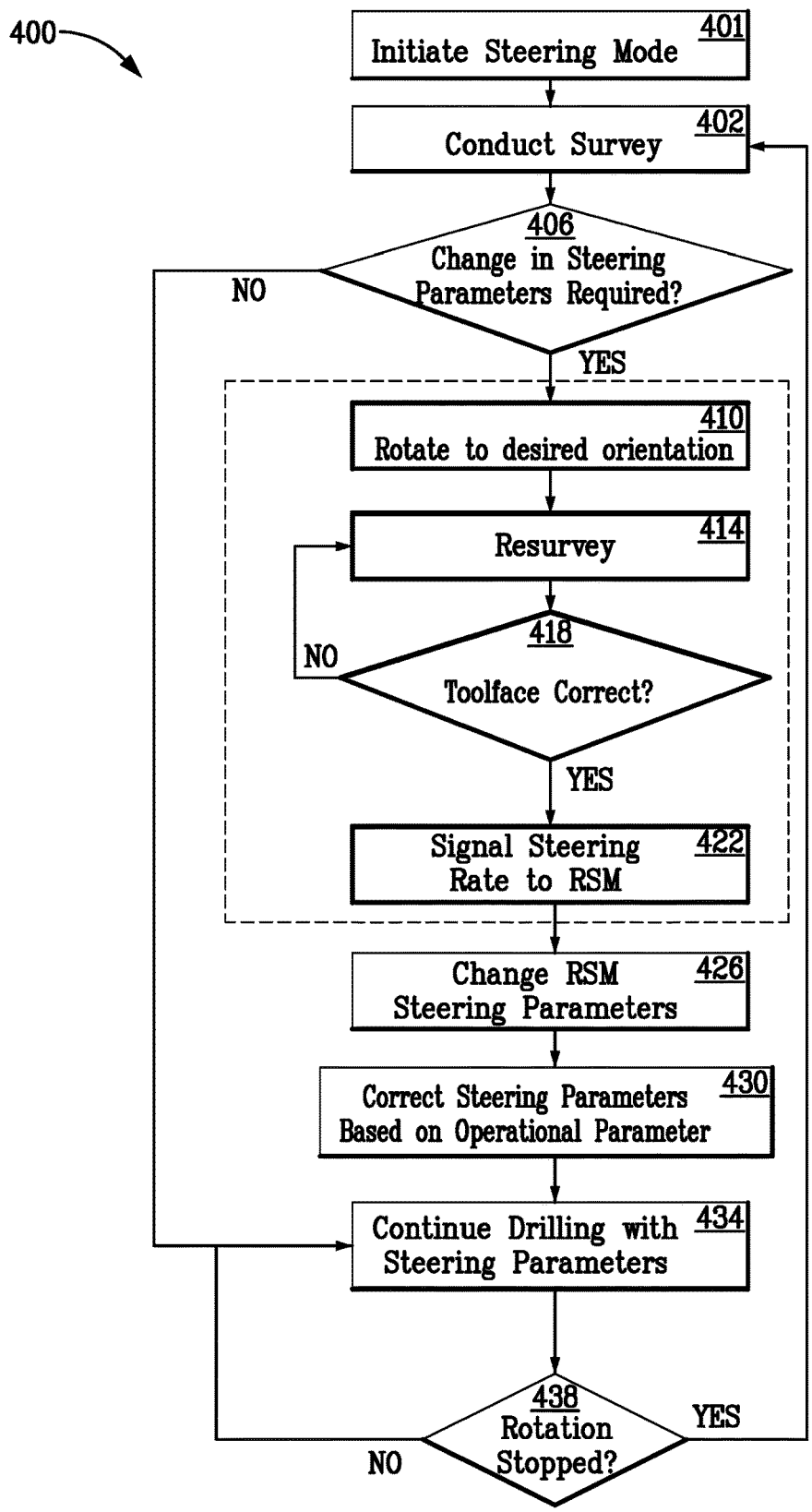
FIG. 13 is a process flow diagram illustrating directional control of the drilling system shown in FIG. 1 during a steering drilling mode.
Figure 14:
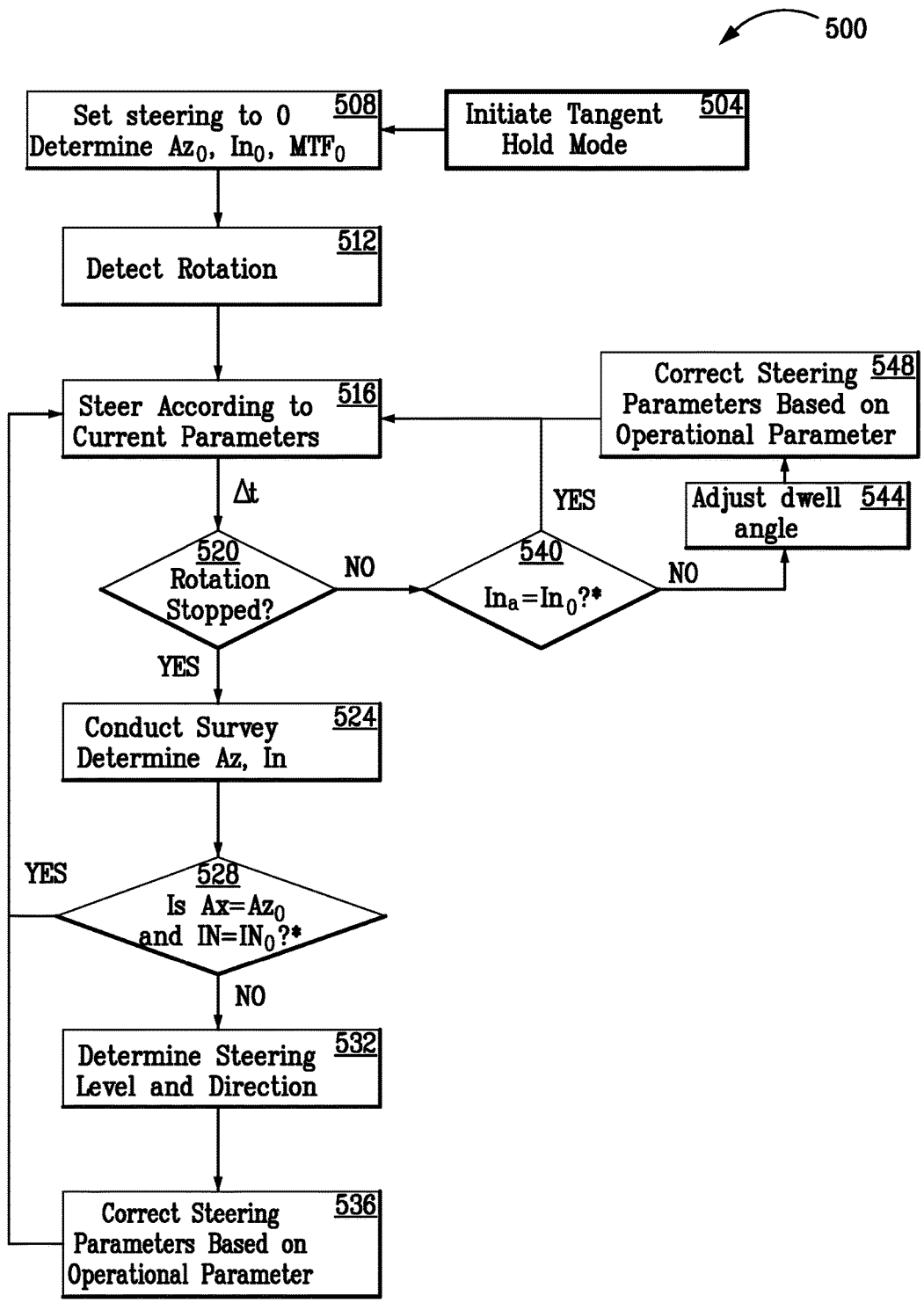
FIG. 14 is a process flow diagram illustrating directional control of the drilling system shown in FIG. 1 during a tangent angle hold drilling mode.

Turning now to FIGS. 12, 13 and 14, the method for controlling the direction of the drill bit 13 based on one or more operating parameters of the RSM system 10 can be used during the vertical drilling mode (FIG. 12), the steering mode (FIG. 13), and the tangent angle hold mode (FIG. 14). An embodiment of the present disclosure includes a method 300 for forming vertical section 17v of the borehole. The method 300 initiates in block 301 when the operator inputs into the surface control system 20 instructions to operate the RSM system 10 in a vertical drilling mode.

In block 302, the MWD tool conducts a survey to obtain drilling data that is indicative of the actual inclination of the drill bit 13. For example, the MWD tool magnetometers and accelerometers obtain respective drilling data regarding the drill bit 13 that can be used to determine actual inclination of the drill bit. The drilling operator can input instructions to the surface control system 20 to cause the MWD tool 30 the conduct the survey. Alternatively, the MWD tool 30 can be programmed to conduct the survey automatically when the drill string is not rotating, such as when drilling stops to add another section of drill pipe to the drill string 12. The drilling data is obtained by sensors is transmitted to the MWD processor. In block 306, an MWD processor determines, based on drilling data obtained by the sensors, the actual inclination of the drill bit 13. It should be appreciated the drilling data could be transmitted directly the RSM controller 118 for determination of the actual inclination of the drill bit.

In block 310, the processor compares the actual inclination values to the expected inclination values so as to determine the presence and extent of any deviation in inclination. The expected inclination values can be stored in the computer memory of the MWD tool 30, the surface control system 20, or the RSM controller 118. The expected inclination is the inclination of the drill bit according to the well plan and a particular point in the drilling operation. The expected inclination can be a specific value or range of inclination values. If the actual inclination value is greater than the expected inclination value, the drill bit is deviating away from the predetermined drilling direction and drill bit direction should be adjusted as further explained below. Process control is transferred to block 314. In block 314, the processor determines the tool face angle of the drill bit 13. Both the gravitation tool face (GTF) and the magnetic tool face (MTF) are determined. The processor includes instructions to set the magnetic tool face null (MTFo) equal to the sum of the gravitation tool face and the magnetic tool face. The tool face angle is a measure of the angular orientation of a component of the RSM system 10. The RSM system can guide the drill bit 13 back toward the predetermined drilling direction based on the tool face angle and actual or known inclination of the drill bit. For instance, the RSM processor can determine the steering level required to guide the drill bit back toward the drilling direction. Process control can be transferred to block 318.

In block 318, the RSM processor determines the steering level or parameters required to direct the drill bit 13 back toward the predetermined drilling direction. The steering parameter can include at least the expected dwell angle of the arms 112 and the rotational orientation that the assembly 112 should have at the onset of arm activation. The RSM processor can, based at least one the tool face angle of the RSM system and the actual inclination of the drill bit, determine the steering parameters, and cause the controller 118 to actuate the moveable arms 112 against along a particular portion of the borehole wall so that the drill bit is guided back toward the predetermined drilling direction. In other words, the processor determines, given the tool face angle X and inclination Y, the actuation assembly 112 needs to be activated against a specific location on the borehole wall and for a specific dwell angle.

in block 322, the RSM system is configured to correct the steering parameters based on an operational parameter of the RSM system 10. If RSM system 10 has a lower than expected pump pressure between the inlet and outlet ports 131a and 131b measured via the pressure assembly 138, the steering parameters (as determined in block 318) can be corrected. For instance, if the steering parameters as determined in block 318 include an expected dwell angle of about 45 degrees, based upon the anticipated pressure which provides the steering force. If the pump pressure is lower than anticipated, the steering provided during the activation will be decreased and will not cause the well trajectory to turn as rapidly as planned. Accordingly, if the RSM processor determines that the pump differential pressure has decreased by a threshold amount, the RSM processor sends instructions to the controller 118 to increase the dwell angle. In particular, the RSM controller 118 can increase the duration that the valve 120 is energized, thereby increasing the duration that high pressure fluid causes the actuators 154 bias the actuation assembly 112 into the active configuration whereby the arm exerts the second force against the borehole wall, which increases the steering effect. Once the steering parameters have been corrected, process control is transferred to block 326. It should be appreciated the steering parameters can be corrected based one other operational parameters of the RSM system. For instance, the steering parameters can be corrected based on the efficiency that the arm is activating, and/or the lag time between valve activation and arm member activation.

Referring back to block 310, if the measured inclination values are no greater than the expected inclination values, the process control is transferred to block 316. In block 316, the steering level is set to a zero value and process control is transferred to block 326. In block 326, one or more sensors detect rotation of the drill string 12. Process control is transferred to block 330.

In block 330, the RSM system 10 steers the drill bit according to the steering parameters. Then, in block 324, a determination is made if the drill string has stopped rotating. If drill string rotation has stopped, the MWD tool 30 can conduct a survey as indicated in block 302. The method 300 can cycle through blocks 302 through 330 as along as the RSM system 10 is operating in the vertical drilling mode.

As shown block 334, if the process determines that the drill string 12 is rotating, process control is transferred to block 338. In block 338, the actual inclination of the drill bit during rotation is determined. and process control is transferred to block 342. In block 342, the processor determines if the actual inclination during rotation is decreasing. In other words, the processor determines if the actual inclination is different from the expected inclination so as to indicate a deviation in the inclination. A deviation of "0" or deviation decreasing toward "0" is indicative that the drill bit is drilling according to plan. If the deviation in inclination is decreasing, process control is transferred to block 346. In block 346, the processor determines if the decrease in inclination is below a predetermined threshold. If it is not below the threshold, meaning that the actual inclination is decreasing such the drill bit is drilling according to plan, process control is transferred to block 330. If, however, in block 346, the processor determines the inclination is below the threshold, meaning that the inclination is decreasing, but is drill bit 13 is not yet drilling toward the predetermined drilling direction, process control is transferred to block 352. In block 352, the processor is configured to correct the steering parameters based on an operational parameter of the RSM system 10. For instance, as discussed above, the steering parameters can be adjusted based on measured changes in differential pressure of the pump of the RSM system 10. In block 356, the processor causes the dwell angle of the arms to decrease and process control is transferred to block 330, where drilling continues according the steering parameters.

Referring back to block 342, if the processor determines that the inclination is not decreasing, process control is transferred to block 364. In block 354, the processor causes the dwell angle of the actuation assemblies 112 to increase and process control is transferred to block 360. In block 360, the processor is configured to correct the steering parameters based on an operational parameter of the RSM system 10. For instance, as discussed above, the steering parameters can be adjusted based on measured decrease in differential pressure of the pump of the RSM system 10.

When the desired vertical depth of the vertical drill phase has been obtained, the operator can cause the RSM system 10 operate in the steering mode. During the steering mode, the RSM system 10 is turns the drill bit 13 at the planned kick-off point 17k (FIG. 1) toward an offset direction O (FIG. 1). An embodiment of the present disclosure can include a method 400 for guiding the drill bit 13 away from vertical direction V toward an offset direction O during a steering phase. The steering phase of the drilling operation initiates in block 401 when the operator inputs into the surface control system 20 instructions to operate the RSM system 10 in a steering mode. During the steering mode, the rotation of the drill string 12 is stopped while the drilling motor 25 still operates to rotate the drill bit 13. In some cases, drill bit rotation is stopped at the kick-off point in order to add additional sections of pipe as needed. In block 402, an MWD survey is initiated in order to obtain, via one or more sensors, drilling data that indicative of the inclination, azimuth, and tool face of the drill bit. A processor can be used to determine the actual directional drilling information. The actual directional drilling information can include the actual inclination, the actual azimuth of the drill bit, and the tool face angle.

In block 406, a processor determines if the drill bit is drilling according to predetermined drilling direction during the steering mode based on comparison between the actual directional drilling information and the expected directional drilling information. Other factors include the actual vs. desired build up rate, estimated or known drift of the drill bit during rotation through the formation 16, and influence of gravity on the drill string 12 and drill bit 13. Continuing with block 406, the processor determines if a change in steering parameters is required. A change in steering parameters may be required if the drill bit is not drilling according to predetermined drilling direction during the steering mode. More specifically, the processor determines if the actual directional drilling information is consistent with the expected directional drilling information. For instance, if the parameter for actual drilling information is within a predetermined range or threshold, then a change in steering parameters is not indicated. In this situation, process control is transferred to block 434. In block 434, the processor causes the RSM system to operate the drill bit 13 and guidance module 110 according to the planned steering parameters. Next, in block 438, the processor determines if rotation of the drill bit 13 has stopped. If rotation of the drill bit 13 has stopped, process control is transferred to block 402 and the MWD tool 30 conducts another survey. The method 400 continues as indicated until the steering phase of drilling is completed.

Returning to block 406, if the processor determines that the change in steering parameters is needed in order to direct the drill bit 13 toward the predetermined drilling direction, process control is transferred to block 410. In block 410, the operator can input instructions in the surface control system 20 to rotate the drill string 12, and the thus RSM system 10, into the desire orientation. For instance, the first, second, and third actuation assemblies 112a, 112b, and 112c can be rotated to orient at 0 degree, 120 degree, and 240 degree positions, respectively. In this example, the 0 degree position is the position directed toward the surface of the formation and is the upper portion of the borehole 17 along the turn. Process control is transferred to block 414 whereby the MWD tool conducts another survey. Process control is then transferred to block 418.

In block 418, the processor determines if the tool face of the drill bit 13 is correct. In other words, the process determines if the tool face angle of RSM system is aligned with desired orientation to effectuate a change in the steering parameters. If the tool face is not correct, process control is transferred to block 414 and the MWD tool conducts another survey. Thereafter, the processor determines if the tool face angle is correct. If, in block 418, the processor determines that the tool face angle is correct, steering parameters are transmitted (block 422) to the RSM system 10 at the initiation of the operator on the surface or according to the well plan instructions stored in the surface control system memory. Then, in block 426, the processor initiates a change in the steering parameters. For instance, the RSM processor can cause the controller 118 to actuate the arms 112 according the desired steering parameters. Process control can be transferred to block 430. In block, the processor corrects the steering parameters based on a measured operational parameter of the RSM system 10. For instance, the steering parameters can be adjusted based on measured variations in in differential pressure of the pump 114 of the RSM system 10. For instance, in block 430, the processor is configured to, in response to inputs that the differential pressure of the pump 114 has decreased by a threshold amount, cause the dwell angle of the actuation assemblies 112 to increase. This results in the actual dwell angle of the actuation assemblies 112 more consistent with the expected dwell angle of the actuation assemblies 112. As noted above, other operation al parameters can be used as basis to correct the steering parameters, and dwell angle in particular. After the steering parameters are corrected, process control is transferred to block 434. In block 434, as noted above, the drill bit 13 continues to drill the borehole in a direction according the corrected steering parameters. Thus, the drill bit 13 is further guided along the predetermined drilling direction during the steering phase.

Turning to FIG. 14, the drilling operation can initiate the tangent angle hold drilling phase when the drill bit 13 has been turned a sufficient extent at the conclusion of the steering phase of the drilling operation. Accordingly, another embodiment of the present disclosure includes a method 500 for controlling the tangent angle hold phase of the drilling operation. The method 500 can initiate in block 504 when the operator inputs into the surface control system 20 instructions to operate the RSM system 10 in the tangent angle hold mode. In block 504, the RSM system 10 is operated to continually guide the drill bit 13 along the predetermined desired drilling direction for the tangent angle hold phase of the drilling operation.

After the RSM system 10 is set to operate in the tangent angle hold mode, in block 508, the steering direction is set to a null value or "0", with the "0" value being indicative of the predetermined drilling direction during the tangent angle hold mode. Further, in block 508, an initial value of the azimuth, an initial inclination of the drill bit 13, and tool face angle are determined. For instance, the operator can initiate a survey to obtain drilling data indicative of the azimuth and inclination of the drill bit. The processor determines, based on the drilling data obtain by the MWD sensors, the initial azimuth, and the initial inclination of the drill bit 13. The processor is further configured to determine the tool face angle. The initial azimuth, initial inclination and tool face angle determined at the onset of the tangent angle hold mode can be referred to collectively as initial directional drilling information. In block 512, the processor determines if drill string 12 and drill bit 13 is rotating. Process control is transferred to block 516.

In block 516, the RSM system 10 guides the drill bit 13 according the current steering parameters along the predetermined drilling direction. In block 520 after a period of time has passed, the processor determines if rotation of the drill string 12 and drill bit 13 has stopped. If the processor determines that rotation has stopped, process control is transferred to block 524.

In block 524, a survey is initiated the MWD tool obtains drilling data indicative of the azimuth and inclination of the drill bit at the particular point in drilling operation after tangle hold mode phase has been initiated and the initial azimuth and inclination values were determined. The processor determines, based on the drilling data obtain by the MWD sensors, the actual azimuth and the actual inclination of the drill bit 13. Then, the actual azimuth and the actual inclination are transmitted to the controller 118 via the short-hop telemetry device as noted above. The actual azimuth and the actual inclination can be referred to collectively as actual directional drilling information. Process control is transferred to block 528 to the RSM processor.

In block 528, the RSM processor determines 1) if the actual azimuth of the drill bit 13 is different than the initial azimuth of the drill bit 13, and 2) if the actual inclination of the drill bit 13 is different than the initial inclination of the drill bit 13. If the RSM processor determiners that both 1) actual azimuth of the drill bit 13 is different than the initial azimuth of the drill bit 13 by predetermined amount, and 2) the actual inclination of the drill bit 13 is different than the initial inclination of the drill bit 13 by a predetermined amount, the processor determines the appropriate steering level and direction (see block 532). In block 536, the processor corrects, in response to inputs concerning one or more operational parameters of the RSM system, the steering parameters. The steering parameters can be adjusted based on measured changes in differential pressure of the pump 114 of the RSM system 10. For instance, if the differential pressure has decreased by a predetermined amount, the processor causes the dwell angle of the actuation assemblies 112 to increase so as the bring the actual dwell angle of the arms closer the expected dwell angle of the actuation assemblies 112 as determined in by processor in block 532. When the steering parameters have been corrected, process control is transferred to block 516, whereby drilling continues according to set steering parameters.

Returning to block 528, if the RSM processor determiner that both 1) actual azimuth of the drill bit 13 is within the initial azimuth of the drill bit 13 by predetermined amount, and 2) the actual inclination of the drill bit 13 is within the initial inclination of the drill bit 13 by a predetermined amount, process control is transferred to block 516 and the drilling continues according the current steering parameters. Specifically, if the azimuth and inclination are within the predetermined range of the initial azimuth and inclination values, the drill bit is drilling along the predetermined drilling direction and not adjustment to change course of the drill bit is needed.

Returning to block 520, if the processor determines that the rotation of the drill string 12 and drill bit 13 has not stopped a measure of inclination is obtained. As can be seen in block 540, the processor determines, in response to input from MWD sensors regarding directional drilling data, the actual inclination of the drill bit 13 is determined. Further, the processor determines if the actual inclination of the drill bit 13 during rotation thereof is different from the initial inclination of the drill bit 13. If the processor determines that the actual inclination of the drill bit 13 during rotation thereof is within a predetermined range, process control is transferred to block 516 and drilling continues according the predetermined drilling direction. If, however, the processor determines that the actual inclination of the drill bit 13 during rotation thereof is outside of the predetermined range, process control is transferred to block 544. The processor cause adjusts the dwell angle of the actuation assemblies 112 based on the deviation of the actual inclination of drill bit 13 from the initial inclination of the drill bit. Process control is transferred to block 548.

In block 548, the processor corrects, in response to inputs concerning one or more operational parameters of the RSM system, the steering parameters. As noted above, the steering parameters can be adjusted based on a measured change in differential pressure of the pump 114 of the RSM system 10. For instance, if the differential pressure has decreased by a predetermined amount, the processor causes the dwell angle of the actuation assemblies 112 to increase so as the bring the actual dwell angle of the arms closer the desired dwell angle of the actuation assemblies 112 as determined in by processor in block 544. When the steering parameters have been corrected, process control is transferred to block 516, whereby drilling continues according to set steering parameters.

As noted above, the RSM system 10 is configured to correct the steering parameters during vertical, steering and tangent angle hold phases of the drilling operation. The correction of steering parameters is based on the measured operation parameter of the RSM system 10. In one embodiment, the measured operational parameter of the drilling operation is the efficiency of the actual dwell angle of the actuation assemblies 112 compared to the expected dwell angle of the actuation assemblies 112. In another embodiment, the operational parameter of the RSM system 10 is an indication of pump efficiency is reflected in observed pressured drops between pump inlet and outlets. If the pressure differential is less than expected, for instance if the pressure differential is within a predetermined range of values expected given the operating hours of the RSM system, drilling fluid flow rates, and other information concerning the drilling environment, then the steering parameters are not adjusted. If, however, the pressure differential is more than expected, for instance if the pressure differential is outside of predetermined range of values expected, then the steering parameters are adjusted.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

I claim:

1. A method for guiding a direction of a drill bit coupled to a drill string, the method comprising the steps of:
   rotating the drill bit to drill a borehole in an earthen formation according to a predetermined drilling direction;
   determining if an actual drilling direction that the drill bit is drilling the borehole is within a predetermined threshold of the predetermined drilling direction;
   if the actual drilling direction is not within the predetermined threshold of the predetermined drilling direction, actuating at least one actuation assembly of a rotary steerable motor system from an inactive configuration into an active configuration to increase a force applied to the wall of the borehole by the at least one actuation assembly so as to redirect the drill bit toward the predetermined drilling direction;
   measuring with a pressure assembly a differential pressure across an inlet and an outlet of a pump of the rotary steerable system when the actuation assembly is in the active configuration; and
   determining if the differential pressure varies from a predetermined value; and
   automatically adjusting an extent that the at least one actuation assembly is in the active configuration as the differential pressure varies from the predetermined value so as to control redirection of the drill bit toward the predetermined drilling direction.

2. The method of claim 1, wherein the inactive configuration is when a first force is applied the wall of the borehole and the active configuration is when a second force that is greater than the first is applied to the wall of the borehole.

3. The system of claim 2, wherein second force is sufficient to cause the drill bit to change direction and the first force is not sufficient to cause the drill bit to change direction.

4. The method of claim 1, wherein the actuation step includes automatically increasing the extent that the at least one actuation assembly is in the active configuration when the differential pressure decreases from the predetermined value.

5. The method of claim 1, wherein the actuation step includes causing a controller to, in response to input received from a computing device, adjust the extent that the at least one actuation assembly is in the active configuration.

6. The method of claim 5, wherein the computing device is disposed downhole.

7. The method of claim 5, wherein the computing device is at a surface of the earthen formation.

8. The method of claim 1, wherein the method includes the step of determining an efficiency of the at least one actuation assembly, wherein the efficiency is a ratio of 1) an actual portion of each revolution of a drill string that the least actuation assembly in the active configuration and 2) an expected portion of each revolution that the at least one actuation assembly in the active configuration.

9. The method of claim 8, further comprising the step of increasing the extent of the portion of each revolution that the at least one actuation assembly is in the active configuration when the efficiency is less than the predetermined value.

10. The method of claim 1, wherein the at least one actuation assembly includes an actuator and an arm member.

11. The method of claim 1, further comprising the steps of:
    operating the rotary steerable motor system in a vertical drilling mode;
    determining if a tool face angle of the drill bit is within a predetermined range of values; and
    if the tool face angle of the drill bit is within the predetermined range based on the predetermined drilling direction, transmitting an instruction to a controller to cause the at least one actuation assembly to transition into the active configuration so that the drill bit is directed toward the predetermined drilling direction.

12. The method of claim 1, further comprising the steps of:
    operating the rotary steerable motor system in a steering mode so as to turn the drill bit along the predetermined drilling direction through the earthen formation toward an offset direction that is different than a vertical direction; and
    guiding the drill bit toward predetermined drilling direction in response to any determined deviations between the actual drilling direction and the predetermined drilling direction as the drill bit is turned toward the offset direction.

13. The method of claim 1, further comprising the steps of:
    operating the rotary steerable motor system in a tangent angle hold mode along the predetermined drilling direction;
    determining an inclination of the drill bit;
    wherein the step of determining if the actual drilling direction is offset from the predetermined drilling direction includes determining if the inclination of the drill bit is within a predetermined range of values; and adjusting the extent that the at least one actuation assembly is in the active configuration when the inclination of the drill bit is not within the predetermined range of values.

14. The method of claim 13, further comprising the steps of:
determining an azimuth of the drill bit;
the step of determining if the actual drilling direction is offset from the predetermined drilling direction includes determining if the azimuth of the drill bit is within a predetermined range of values; and
adjusting the extent that the at least one actuation assembly is in the active configuration when the azimuth of the drill bit is not within the predetermined range values.

15. The method of claim 1, further comprising the steps of:
operating the rotary steerable motor system in a vertical drilling mode so as to guide the drill bit along the predetermined drilling direction through the earthen formation to define a vertical section of the borehole in substantially vertical direction;
guiding the drill bit according to one or more steering parameters toward predetermined drilling direction during formation of the vertical section of the borehole in response to any determined deviations between the actual drilling direction and the predetermined drilling direction; and
correcting the steering parameters based on one or more operational parameters of the rotary steerable system.

16. The method of claim 1, further comprising the steps of:
operating the rotary steerable motor system in a steering mode so as to turn the drill bit along the predetermined drilling direction away from the vertical direction; and
guiding the drill bit according to one or more steering parameters toward predetermined drilling direction in response to any determined deviations between the actual drilling direction and the predetermined drilling direction during the turn portion of the borehole;
correcting the steering parameters based on one more operational parameters of the rotary steerable system.

17. The method of claim 1, further comprising the steps of:
operating the rotary steerable motor system in a tangent angle hold mode so as to guide the drill bit along the predetermined drilling direction along an offset direction that is angularly offset with respect to the vertical direction; and
guiding the drill bit according to one or more steering parameters toward predetermined drilling direction in response to any determined deviations between the actual drilling direction and the predetermined drilling direction as the drill bit drills along the offset direction; and
correcting the steering parameters based on one more operational parameters of the rotary steerable system.

18. A method for controlling a direction of a drill bit coupled to a drill string, the method comprising the steps of:
causing the drill bit to drill a borehole into the earthen formation along a predetermined drilling direction;
guiding the drill bit with a rotary steerable motor system according to one or more steering parameters toward the predetermined drilling direction during formation of the borehole in response to any determined deviations between an actual drilling direction and the predetermined drilling direction; and
correcting the steering parameters based on one or more operational parameters of the rotary steerable system, wherein the one or more operational parameter is a differential pressure of a pump in the rotary steerable motor system.

19. The method of claim 18, further comprising the steps of:
operating the rotary steerable motor system in a vertical drilling mode so as to guide the drill bit along the predetermined drilling direction through the earthen formation to define a vertical section of the borehole in substantially vertical direction;
guiding the drill bit according to one or more steering parameters toward predetermined drilling direction during formation of the vertical section of the borehole in response to any determined deviations between the actual drilling direction and the predetermined drilling direction; and
correcting the steering parameters based on one more operational parameters of the rotary steerable system.

20. The method of claim 18, further comprising the steps of:
operating the rotary steerable motor system in a steering mode so as to turn the drill bit along the predetermined drilling direction away from the vertical direction; and
guiding the drill bit according to one or more steering parameters toward predetermined drilling direction in response to any determined deviations between the actual drilling direction and the predetermined drilling direction during the turn portion of the borehole;
correcting the steering parameters based on one more operational parameters of the rotary steerable system.

21. The method of claim 18, further comprising the steps of:
operating the rotary steerable motor system in a tangent angle hold mode so as to guide the drill bit along the predetermined drilling direction along an offset direction that is angularly offset with respect to the vertical direction; and
guiding the drill bit according to one or more steering parameters toward predetermined drilling direction in response to any determined deviations between the actual drilling direction and the predetermined drilling direction as the drill bit drills along the offset direction; and
correcting the steering parameters based on one more operational parameters of the rotary steerable system.

22. The method of claim 18, wherein the steering parameter is an angle along which an actuation assembly is in an active configuration.

23. The method of claim 22, wherein the step of correcting the steering parameters based on one more operational parameters of the rotary steerable system includes adjusting the angle along which the actuation assembly is in the active configuration.

* * * * *